US00RE42509E

(19) United States
(12) Reissued Patent
Nagashima et al.

(10) Patent Number: US RE42,509 E
(45) Date of Reissued Patent: Jun. 28, 2011

(54) DOCUMENT PROCESSING TO PERMIT SHARING OF CONTENT BY PLURAL DOCUMENTS

(75) Inventors: Masaaki Nagashima, Saitama-ken (JP); Tadashi Yamakawa, Kanagawa-ken (JP); Akihiro Kohno, Tokyo (JP)

(73) Assignee: Canon Kabushiki Kaisha, Tokyo (JP)

(21) Appl. No.: 09/612,575

(22) Filed: Jul. 7, 2000

Related U.S. Patent Documents

Reissue of:
(64) Patent No.: 5,778,398
Issued: Jul. 7, 1998
Appl. No.: 08/277,005
Filed: Jul. 19, 1994

(30) Foreign Application Priority Data

Jul. 20, 1993 (JP) ..... 5-179233
Jul. 20, 1993 (JP) ..... 5-179234
Jul. 20, 1993 (JP) ..... 5-179238
Jul. 20, 1993 (JP) ..... 5-179239

(51) Int. Cl.
*G06F 15/16* (2006.01)
(52) U.S. Cl. ..... 715/234; 715/200
(58) Field of Classification Search ..... 715/513, 715/514, 516, 517, 501.1, 500, 200, 205–208, 715/234; 345/760, 751, 753; 707/511, 512
See application file for complete search history.

(56) References Cited

U.S. PATENT DOCUMENTS 5,220,657 A * 6/1993 Bly et al. ..... 345/751 X
5,511,197 A * 4/1996 Hill et al. ..... 709/328

FOREIGN PATENT DOCUMENTS

EP 0319232 A3 11/1988
EP 03192232 A3 * 11/1988
EP 0 319 232 A2 6/1989
EP 0444669 A2 * 2/1991
EP 0462915 A3 5/1991
EP 0462915 A3 * 6/1991

(Continued)

OTHER PUBLICATIONS

"FolioPub: A Publication Management System", J. H. Schlichter et al., Computer, vol. 21, No. 1. pp. 61-69 XP000052069 New York, USA, Jan. 1988.

(Continued)

*Primary Examiner* — Cesar B Paula
(74) *Attorney, Agent, or Firm* — Fitzpatrick, Cella, Harper & Scinto

(57) ABSTRACT

A document processing apparatus which permits the sharing of a document element in a document structure while ensuring that any change to the content appears in the document element in each document sharing it. In a document processing apparatus for managing a plurality of documents each containing a plurality of document elements, a document element having content to be shared with a second document is designated from a plurality of document elements of a first document, and the content of the designated document element is defined as the content of a predetermined document element of the second document to be shared as common content by the first and second documents. Further, any document element having shared content is detected from a document when the display of the document is commanded, and is displayed in a distinguishable manner from other portions.

42 Claims, 41 Drawing Sheets

FOREIGN PATENT DOCUMENTS

| | | | | |
|---|---|---|---|---|
| EP | 9108538 | | * | 6/1991 |
| EP | 0 444 669 | A2 | | 9/1991 |
| EP | 0 462 915 | A2 | | 12/1991 |
| EP | 0578207 | A2 | * | 7/1993 |
| WO | 91/08538 | | | 6/1991 |

OTHER PUBLICATIONS

Computer. vol. 21. No. 1. Jan. 1988 New York. US. pp. 61-69, XP 000052069, J.H. Schlichter et al FolioPub: A Publication Management System. p. 64.

* cited by examiner

FIG. 2

```
<article>
<title>ABC
</title><abstract>defg, hijk
</abstract><body>
<section><header>Introduction
</header><paragraph>
.....
.....
.....
</body>
</article>
```

FIG. 3

```
<articlelist>
<item>
<itemhead>ABC
</itemhead><itemparagraph>lmno.
</itemparagraph>
</item><item>
<itemhead>abc
</itemhead><itemparagraph>pqrs.
</itemparagraph>
</item>...
.....
.....
</articlelist>
```

FIG. 12

```
<article>
<title>ABC
</title><abstract> defg, hijk
</abstract><body>
<section><header>Introduction
</header><paragraph>
.....
.....
.....
</body>
</article>
```

FIG. 13

```
<article>
<title>ABC
</title> <abstract>defg, hijk
</abstract> <body>
<section><header>Introduction
</header><paragraph>
.....
.....
.....
</body>
</article>
```

```
<article>
<title>ABC
</title><abstract>input {sharedoc}
</abstract> <body>
.....
.....
.....
</body>
</article>
```

```
\def\CAL {defg, hijk. }
<dictionary>
...
<item>
<itemhead>calendar
</itemhead><itemparagraph> CAL
</itemparagraph>
</item><item>
<itemhead>calendar
</itemhead><itemparagraph> CAL
</itemparagraph>
...
...
</dictionary>
```

FIG. 40

```
・[ABC] <share>defg, hijk. </share>
・[abc] pqrs.
・ ....
```

FIG. 42

```
・[ABC] <share1>de<emphasize><share2>XYZ</share2></emphasize>fg, hijk. <share1>
・[abc] pqrs.
・ ....
```

FIG. 43

```
<articlelist>
<item>
<itemhead>ABC
</itemhead><itemparagraph> ◇ de<emphasize> ◇ ◇ XYZ ◆ ◆
</emphasize>fg, hijk. ◆
<itemparagraph>
</item><item>
</itemhead>abc
</itemhead><itemparagraph>pqrs.
</itemparagraph>
</item>...
.....
.....
</articlelist>
```

DOCUMENT PROCESSING TO PERMIT SHARING OF CONTENT BY PLURAL DOCUMENTS

Matter enclosed in heavy brackets [ ] appears in the original patent but forms no part of this reissue specification; matter printed in italics indicates the additions made by reissue.

*This application is a reissue of U.S. Pat. No. 5,778,398, which issued from application Ser. No. 08/227,005, filed Jul. 19, 1994.*

BACKGROUND OF THE INVENTION

1. Field of the Invention

The present invention relates to a document processing apparatus and method for managing a plurality of documents each containing a plurality of document elements.

2. Related Background Art

In a past, a cut and paste method has been used as a method for defining a content of a document as a content of another document. For example, let us consider a case in which abstracts of a certain number of articles are to be prepared.

FIG. 2 shows article document data and FIG. 3 shows abstract document data. They follow the SGML description method in which a document element starts with a document element start symbol <xxx> and ends with a document element end symbol </xxx>, where xxx contains a document name of the document element. A character string between the document element start symbol and the document element end symbol represents document element content. It is assumed that the document element comprises a document element name and document element content. Other secondary information may also be included.

Where content "defg, hijk" of a document element <abstract> of the article document data of FIG. 2 is to be quoted as is for the content of a document element <itemparagraph> of the abstract document data of FIG. 3, the existing content "lmno," of <itemparagraph> is first erased, and the content "defg, hijk" of the <abstract> is pasted in situs by the cut and paste method.

Alternatively, the foregoing may be realized by a hyperdocument method. In this method, a link to the content of other document data is pasted from a certain portion of a document and a button 47 shown in FIG. 4 is filled in that portion. When the button is clicked, another window appears so that the content of the other document data, to which the link was pasted, is displayed.

However, in the cut and paste method, since the identical data are copied and present at two locations as separate data, when a common portion is corrected in either one of the article or the abstract and it is desired that content at both locations shall match, the same correction must be made for the other. This is not effective because the same correction is repeated twice, and if done only once, the desired conformity is lost.

Further, in the method of pasting the link, the above problem is solved but the button must be clicked in order to display the document data to which the link was pasted, on the display, and where multiple sharing is made in order to display it on another window than that on which the document data having the button embedded therein is displayed, the number of windows increases and the windows overlap. Thus, the display is complex, and it becomes hard for the user to grasp the series of documents.

Further, since they share the document data including the document layouts, it is not possible to display the respective documents with required layouts.

SUMMARY OF THE INVENTION

It is an object of the present invention to provide a document processing apparatus which permits a plurality of document elements to share contents in respective document structures while maintaining the consistency to the change of content.

It is another object of the present invention to prevent a content shared by a plurality of document elements from being erroneously broken by the edition to one document element.

It is other object of the present invention to discriminate shared portions and non-shared portions when a document is displayed.

It is other object of the present invention to permit to determine whether a subject to be edited is a shared portion or not when a document is to be edited.

According to one aspect, the present invention which achieves these objectives relates to a document processing apparatus for managing a plurality of documents each containing a plurality of document element, comprising: designation means for designating, from a plurality of document elements of a first document, a document element having a content to be shared with a second document; and definition means for defining the content of the document element designated by the designation means as a content of a predetermined document element of the second document.

According to another aspect, the present invention relates to a document processing apparatus for managing a plurality of document each containing a plurality of document elements, comprising; storage means for storing document data to be used as contents of the document elements with file names; definition means for defining a command for reading the file content to each of the document elements to be used as the contents of the document data, by using the file the name as an argument of the command; and control means for outputting the file content of the file name as the content of the document element when the document containing the document element having the command defined by the definition means is outputted.

According to other aspect, the present invention relates to a document processing apparatus for managing a plurality of documents each containing a plurality of document elements, comprising; permission means for permitting the sharing of designated ones of a plurality of document elements of a first document with the content of other document; and definition means for designating a desired one of the document elements having the sharing of content permitted by the permission means and defining the content of the designated document element as a content of a predetermined document element of a second document.

According to other aspect, the present invention relates to a document processing apparatus for managing a plurality of documents each containing a plurality of document element, comprising: designation means for designating, from a plurality of document elements of a first document, a document element having a content to be shared with a second document; separation means for separating the content of the document element designated by the designation means from the first document; first definition means for defining such that the content of the document element separated by the separation means is referred to by the first document as the content of the designated document element; and second definition means for defining such that the content of the document element separated by the separation means is referred to by the second document as a content of a predetermined document.

According to other aspect, the present invention relates to a document processing apparatus for managing a plurality of documents each containing a plurality of document elements by setting management information in each document, comprising: designation means for designating, from a plurality of document elements of a first document, a document element having a content to be shared with a second document, setting means for setting new management information to the document element designated by the designation means; control means for controlling the document element designated by the designation means to manage by the management information set by the setting means in place of the management information to the first document element; first definition means for defining to refer the management content of the management information set by the setting means as the content of the designated document element in the first document; and second definition means for defining to refer the management content of the management information set by the setting means as the content of the designated document element in the second document.

According to other aspect, the present invention relates to a document processing apparatus for managing a plurality of documents each containing a plurality of document elements, comprising: definition means for defining one document element content as a sharing content to be shared by a plurality of document elements; command means for commanding the display of the document; detection means for detecting the document element containing the sharing content defined by the definition means, from the document commanded by the command means; and display control means for displaying the document commanded by the command means in a manner distinguishable from other portions of the document element detected by the detection means.

According to other aspect, the present invention relates to a document processing apparatus for managing a plurality of documents each containing a plurality of document elements, comprising: definition means for defining one document element content as a sharing content to be shared by a plurality of document elements; command means for commanding the edition of the document element; discrimination means for determining whether the document element designated by the designation means contains the sharing content defined by the definition means; and notification means for notifying to a user of the determination as to the sharing content by the discrimination means.

According to other aspect, the present invention relates to a document processing method in a document processing apparatus for managing a plurality of documents each containing a plurality of document element, comprising the steps of: designating, from a plurality of document elements of a first document, a document element having a content to be shared with a second document; and defining the content of the designated document element as a content of a predetermined document element of the second document.

According to other aspect, the present invention relates to a document processing method in a document processing apparatus for managing a plurality of document each containing a plurality of document elements, comprising the steps of; storing document data to be used as contents of the document elements with file names, in a memory; defining a command for reading the file content to each of the document elements to be used as the contents of the document data, by using the file name as an argument of the command; and outputting the file content of the file name as the content of the document element when the document containing the document element having the command defined by the definition means is outputted.

According to other aspect, the present invention relates to a document processing method in a document processing apparatus for managing a plurality of documents each containing a plurality of document elements, comprising the steps of; permitting the sharing of designated ones of a plurality of document elements of a first document with the content of other document; and designating a desired one of the document elements having the sharing of content permitted by the permission means and defining the content of the designated document element as a content of a predetermined document element of a second document.

According to other aspect, the present invention relates to a document processing method in a document processing apparatus for managing a plurality of documents each containing a plurality of document element, comprising: designating, from a plurality of document elements of a first document, a document element having a content to be shared with a second document; separating the content of the document element designated by the designation means from the first document; defining such that the content of the document element separated by the separation means is referred to by the first document as the content of the designated document element; and defining such that the content of the document element separated by the separation means is referred to by the second document as a content of a predetermined document.

According to other aspect, the present invention relates to a document processing method in a document processing apparatus for managing a plurality of documents each containing a plurality of document elements by setting management information in each document, comprising the steps of: designating, from a plurality of document elements of a first document, a document element having a content to be shared with a second document, setting new management information to the designated document element; controlling the designated document element to manage by the set management information in place of the management information to the first document element; defining to refer the management content of the set management information as the content of the designated document element in the first document; and defining to refer the management content of the set management information as the content of the designated document element in the second document.

According to other aspect, the present invention relates to a document processing method in a document processing apparatus for managing a plurality of documents each containing a plurality of document elements, comprising the steps of: defining one document element content as a sharing content to be shared by a plurality of document elements; commanding the display of the document; detecting the document element containing the defined sharing content from the commanded document; and displaying the command document in a manner distinguishable from other portions of the detected document element.

According to other aspect, the present invention relates to a document processing method in a document processing apparatus for managing a plurality of documents each containing a plurality of document elements, comprising the steps of: defining one document element content as a sharing content to be shared by a plurality of document elements;

commanding the edition of the document element; determining whether the designated document element contains the sharing content defined by the definition means; and notifying to a user of the determination as to the sharing content.

Other objective and advantages besides those discussed above shall be apparent to those skilled in the art from the description of preferred embodiments of the invention which follows. In the description, reference is made to the accompanying drawings, which form a part thereof, and which illustrate examples of the invention. Such examples, however, are not exhaustive of the various embodiments of the invention, and therefore reference is made to the claims which follow the description for determining the scope of the invention.

BRIEF DESCRIPTION OF THE DRAWINGS

FIG. 2 shows an example of article document data, FIG. 3 shows an example of abstract document data, FIG. 12 shows an example of display at a time of selection of a document element, FIG. 13 shows an example of display at a time of selection of a document element, FIG. 40 shows an example of display of abstract data, FIG. 42 shows an example of display when shared elements are nested, FIG. 43 shows an example of display when shared elements are nested.

DETAILED DESCRIPTION OF THE PREFERRED EMBODIMENTS

Figure 1:
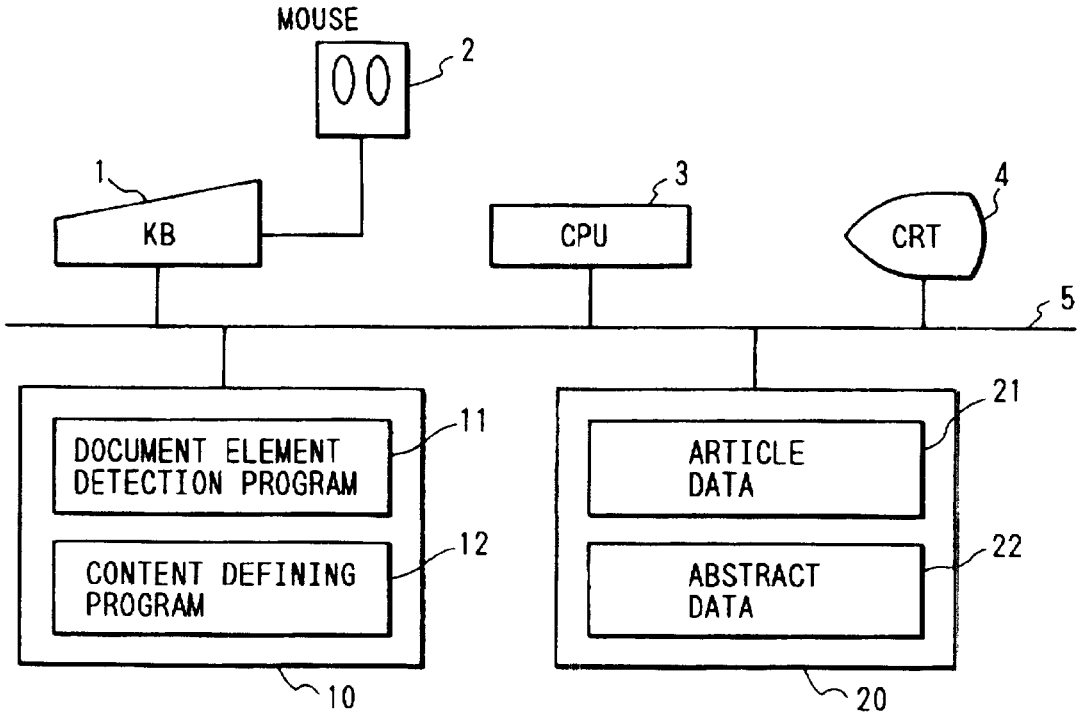
FIG. 1 shows a block diagram of a document processing apparatus in accordance with an embodiment of the present invention.
Figure 4:
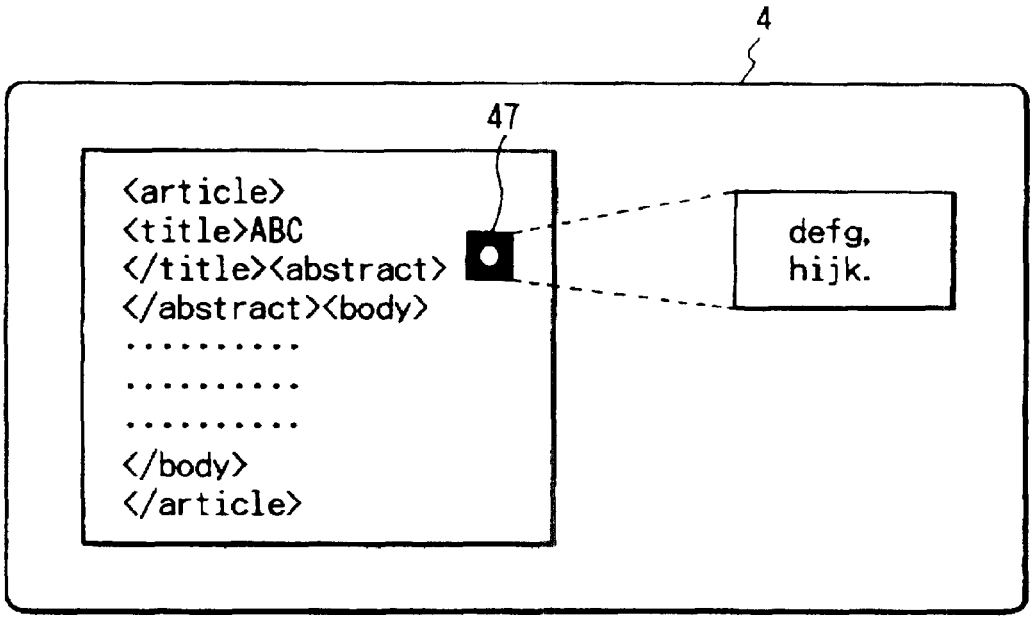
FIG. 4 shows an example of content definition by link.

Referring to the drawings, construction and an operation of a document processing apparatus in accordance with the preferred embodiments of the present invention are explained.

[Embodiment 1]

FIG. 1 shows a block diagram of a basic configuration of a document processing apparatus in accordance with one embodiment of the present invention. Numeral 1 denotes a keyboard for entering characters and commands, numeral 2 denotes a mouse for specifying an area on a display and selecting a menu, numeral 3 denotes a CPU which executes various controls and processes in accordance with programs, and numeral 4 denotes a CRT for displaying data. Numeral 10 denotes a storage for storing programs to be executed and various data, and numeral 20 denotes an auxiliary storage for permanently storing programs and data.

The storage 10 stores a document element detection program 11 for detecting a document element and a content defining program 12 for defining a content of a document element to a content of another document element, and the auxiliary storage 20 stores article data 21 and abstract data 22. The storage 10 may be shared by the auxiliary storage 20.

Figure 6:
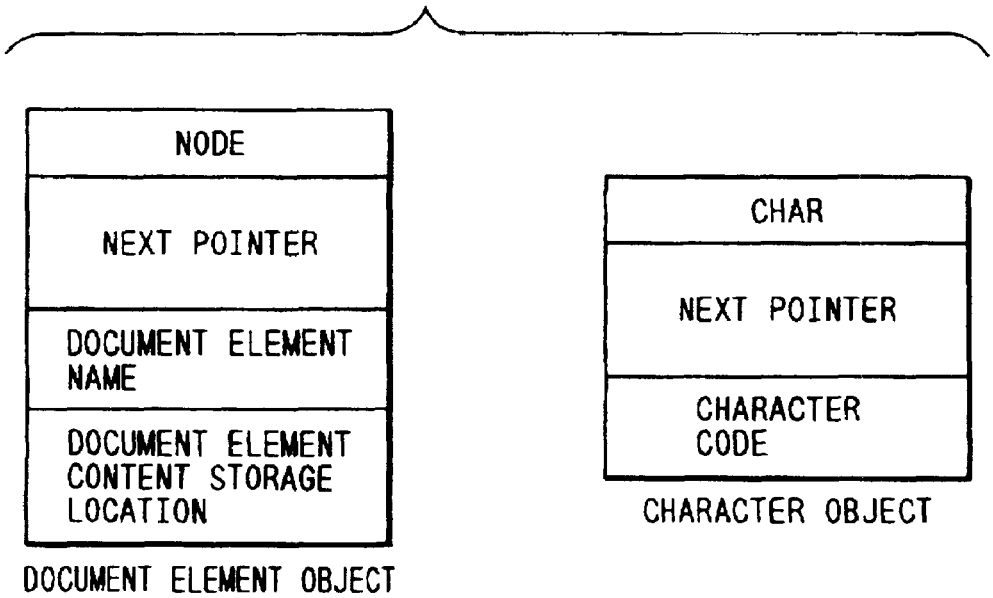
FIG. 6 shows a format of an object.
Figure 5:
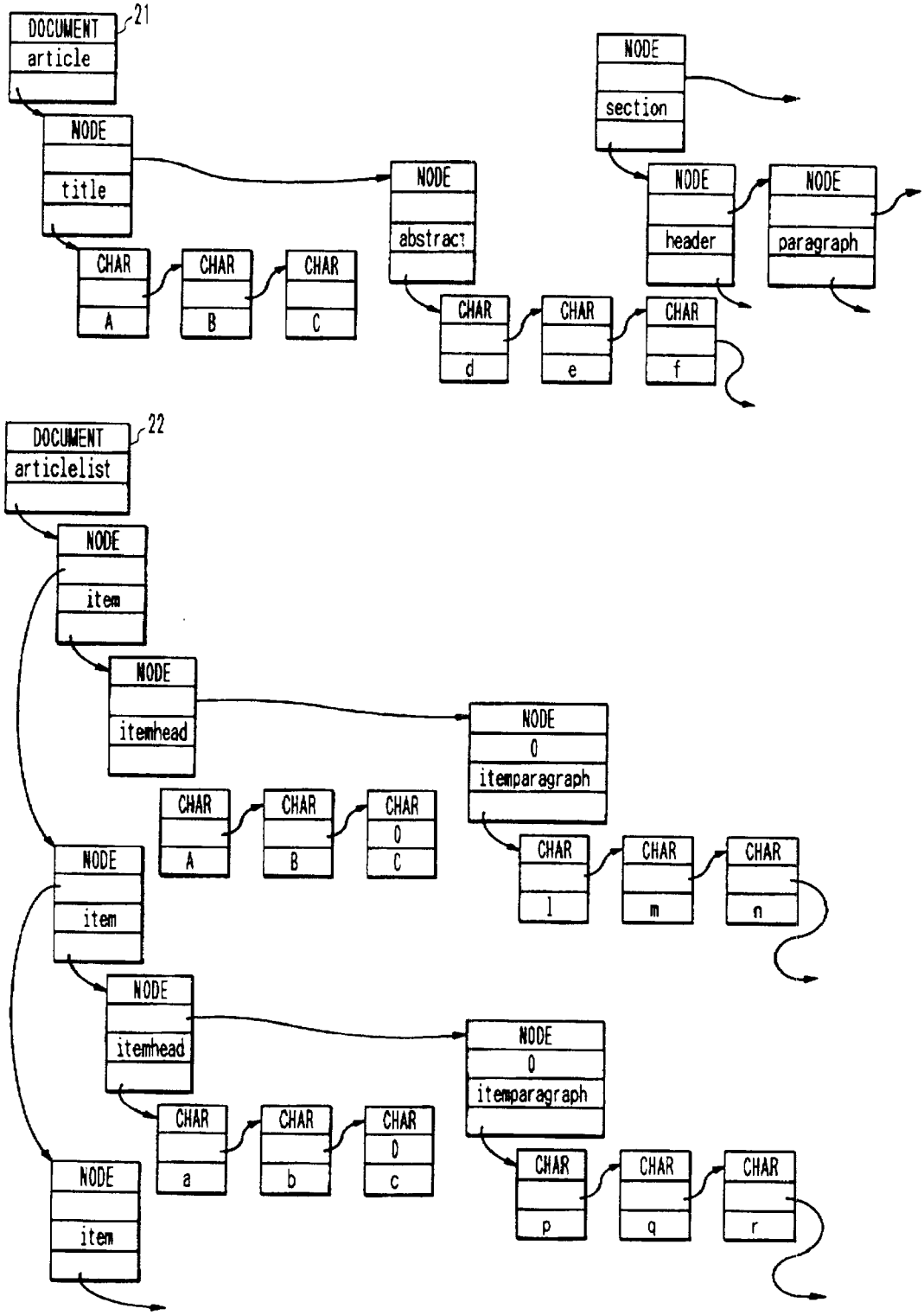
FIG. 5 shows an example of structured document data.

In the present embodiment, structured document data is handled as a memory image by an object database. FIG. 5 shows an example of article data 21 and abstract data 22 managed in the object database. FIG. 6 shows formats of a document element object and character object of FIG. 5. As seen from FIGS. 5 and 6, a content of the document element is a sequence of document element objects or character objects, and a document element content storage location in FIG. 6 is a pointer to the document element content. In FIG. 6, a next pointer is one to a next document element object or character object.

In the present embodiment, the content is defined by sharing the content of one or more other documents. In the following description, it is assumed that article data is a source (src) that provides shared content, and abstract data is a receiver (dist) that receives the shared content, and that the content "defg, hijk" of a document element <itemparagraph> first appeared in the dist is shared by the dist to set the content of the document element <itemparagraph> to "defg, hijk". The process is now explained.

Figure 7:
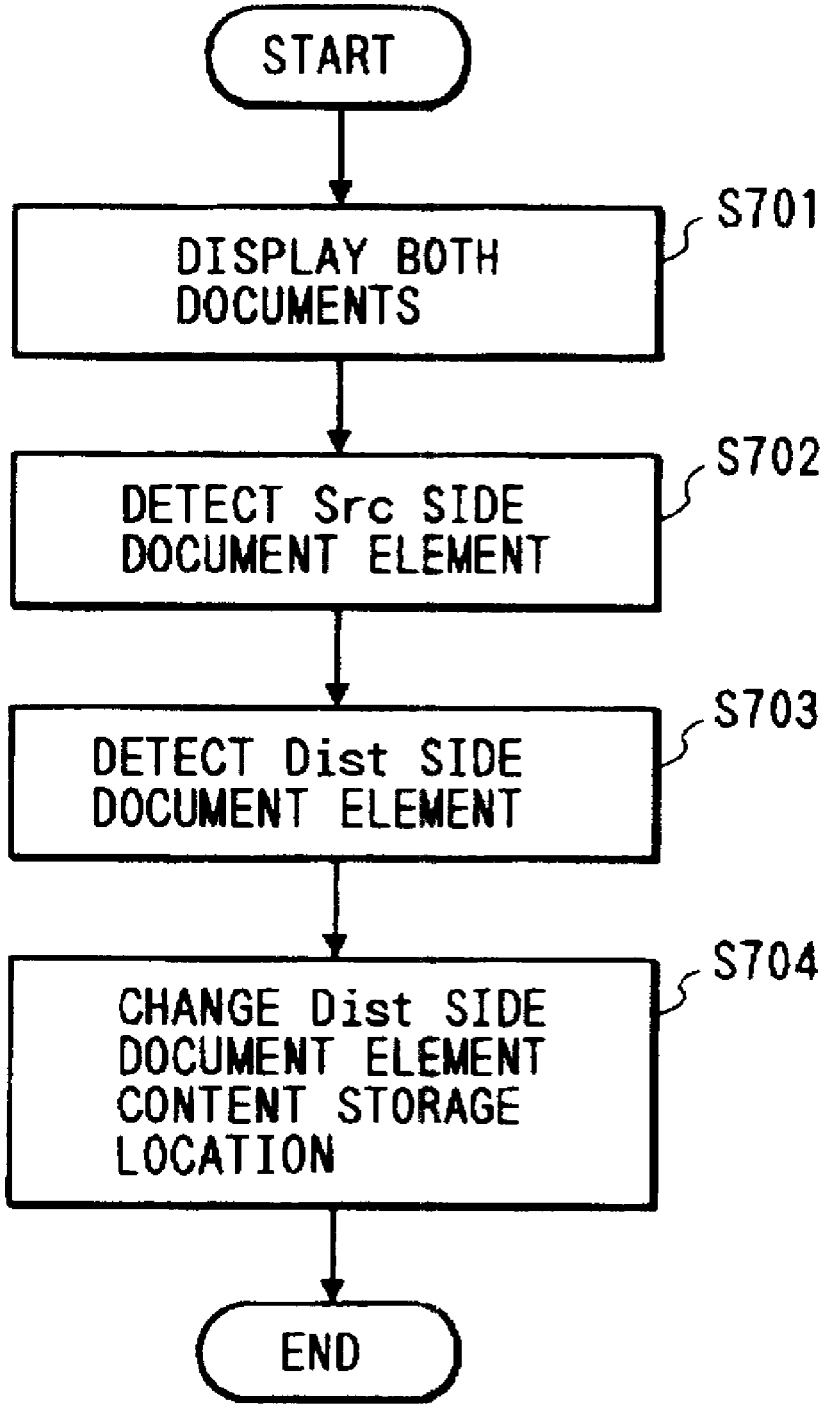
FIG. 7 shows a flow chart of content sharing.
Figure 8:
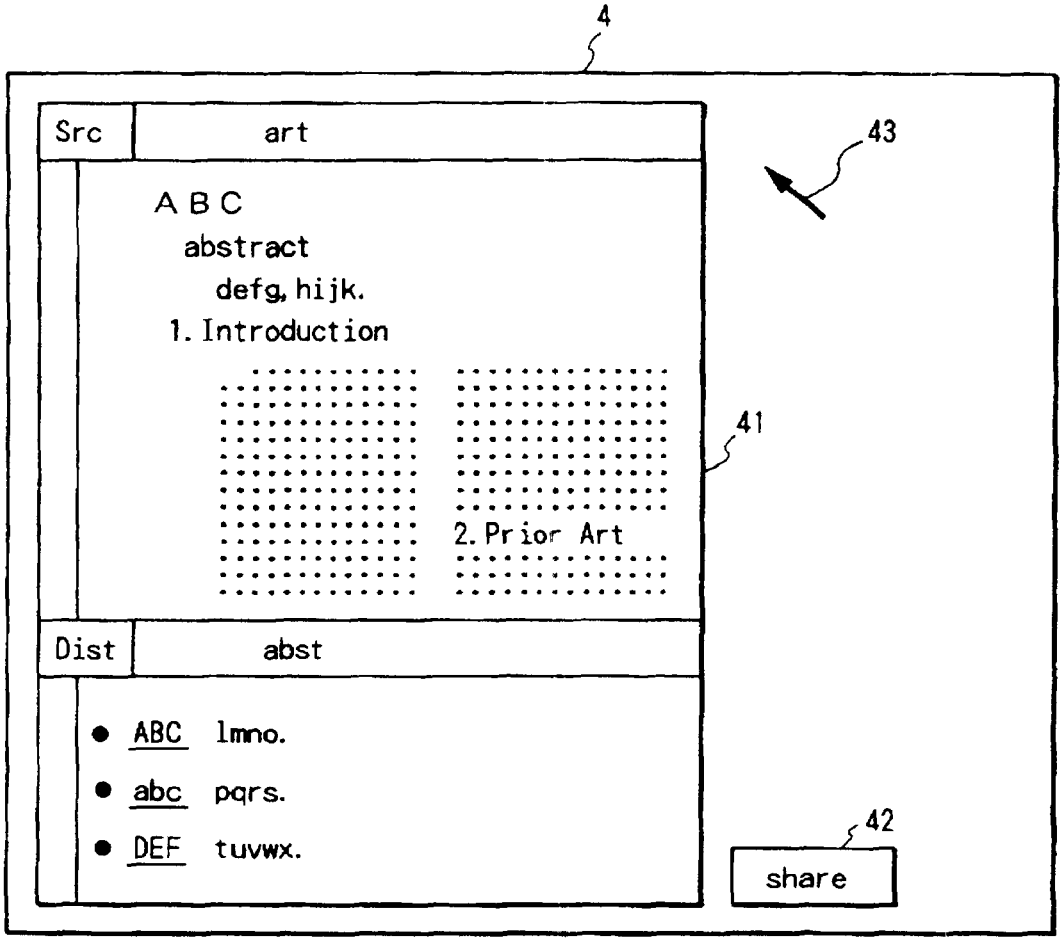
FIG. 8 shows an example of display for sharing.

Referring to a flow chart of FIG. 7, in a step S701, documents of the src and the dist are displayed on a window 41. FIG. 8 shows an example of display of the CRT 4. In FIG. 8, document data are displayed in the layout which facilitate the watching by a user, although they may be displayed with document element start symbols and document element end symbols mixedly interposed, that is, in the forms shown in FIGS. 2 and 3. In the present embodiment, the documents of the src and the dist are displayed on one window 41. For example, article data which is the document of the src is displayed at the top of the window 41 and abstract data which is the document of the dist is displayed at the bottom. The document data of the src and the dist may be identical. Numeral 42 denotes a button for directing the execution of sharing by a click of the mouse, and numeral 43 denotes a mouse cursor.

Figure 9:
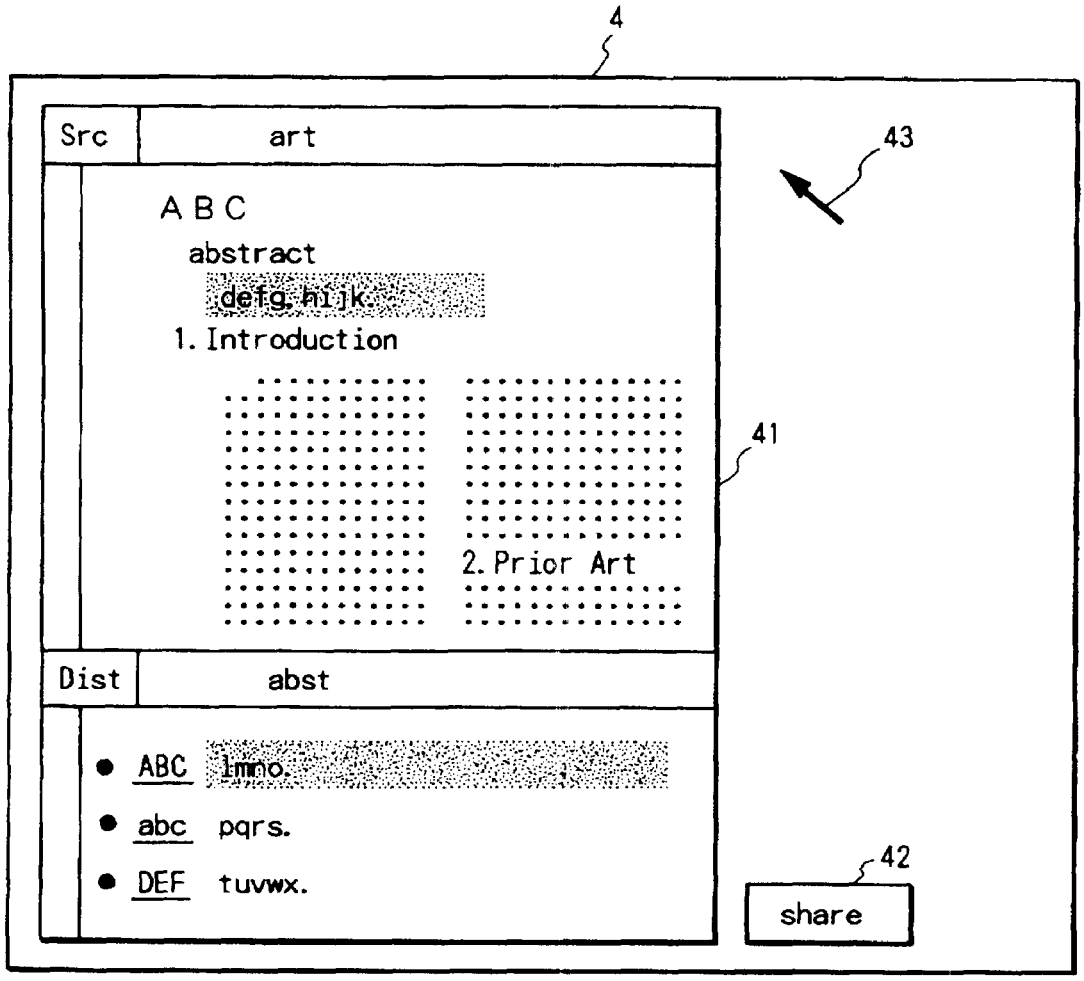
FIG. 9 shows an example of display at a time of selection of a document element.

In a step S702, a document element of the src selected by a user is detected. In a step S703, a document element of the dist selected by the user is detected. The selection is effected by dragging the document element of the dist and the document element of the src by the mouse 2. FIG. 9 shows an example of display when the document elements of the src and the dist are selected by the dragging. Hatched areas in FIG. 9 are selected. The process heretofore is attained by an SGML document editor on a conventional window.

When the share button 42 is clicked, in a step S704, a document element content storage location of the document element object of the dist detected in the step S703 is changed to the document element content storage position of the document element object of the src detected in the step S702.

In this manner, the content of the document element of the dist is shared by the content of the document element of the src. In FIG. 7, the order of the step S702 and the step S703 may be reversed.

Figure 10:
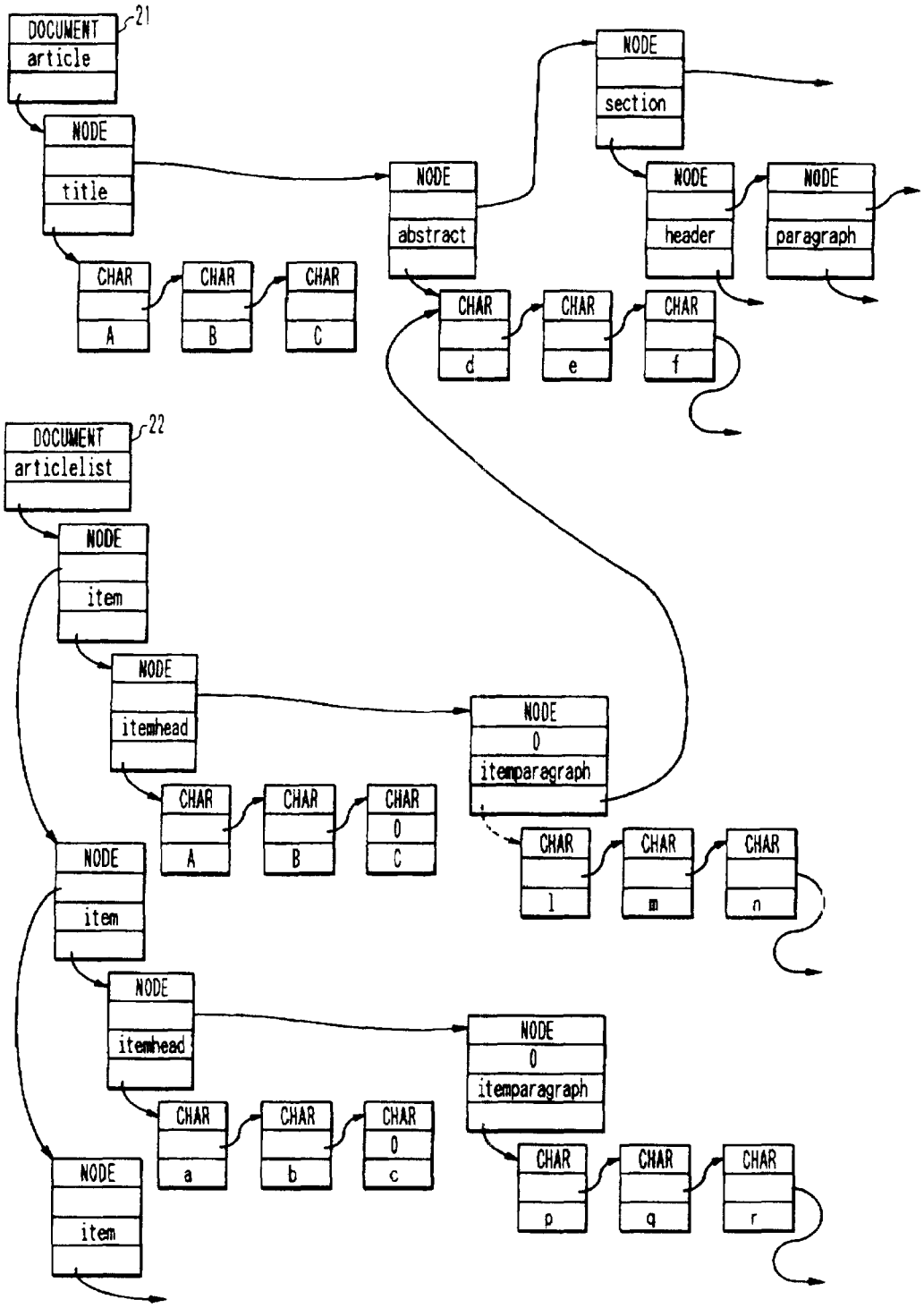
FIG. 10 shows an example of structured document data after the sharing process.

FIG. 10 shows the formats of the article data 21 and the abstract data 22 in the memory (database) after the execution of the sharing process shown in the flow chart of FIG. 7.

The content storage location of the document element <itemparagraph> first appeared in the dist indicates, before the execution, the storage location of the object sequence "lmn . . ." as shown by broken lines, but after the execution, it indicates the storage position of the object sequence "def . . .". Namely, the document element content is shared by the document element <abstract> of the src which indicates the same location.

Figure 11:
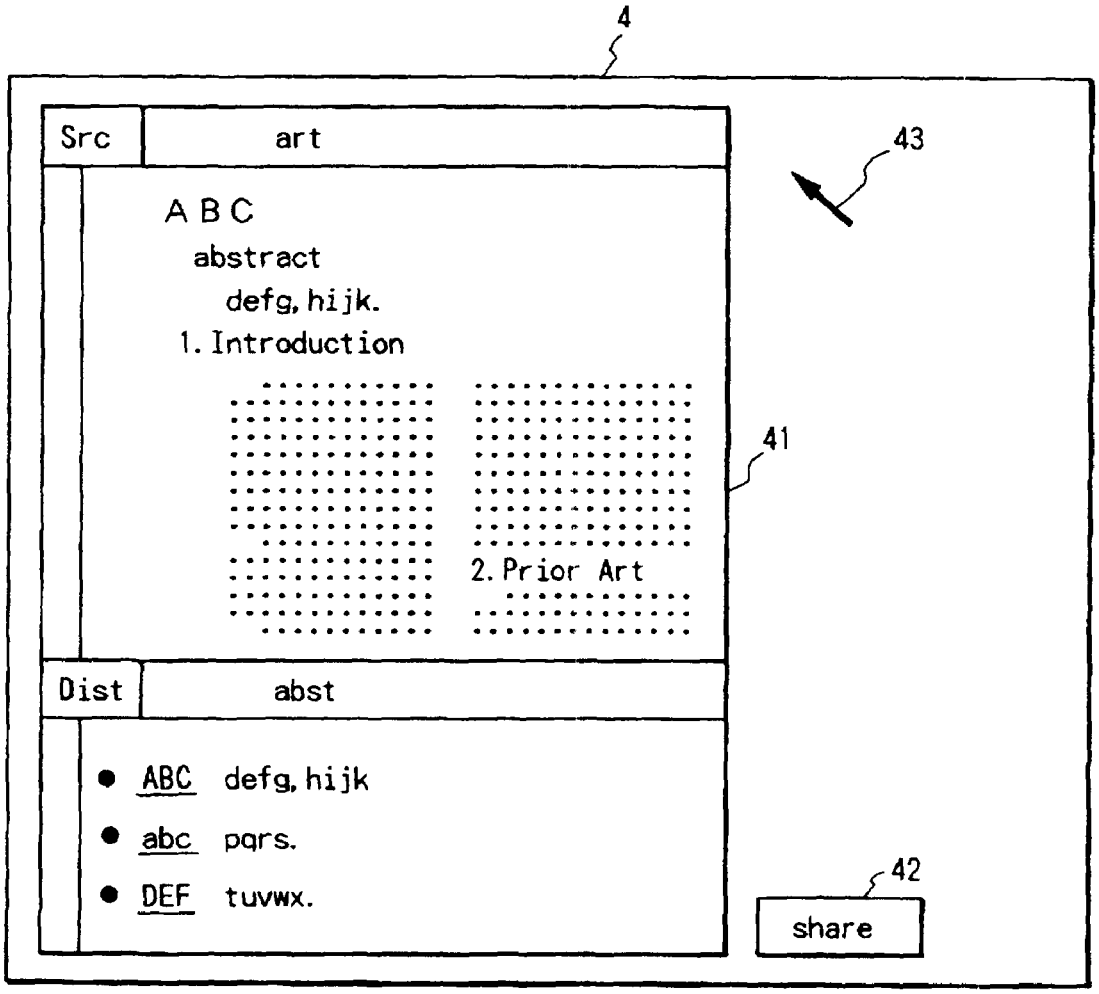
FIG. 11 shows an example of display of document data after the sharing process.

FIG. 11 shows a status in which both document data are displayed when the content of the document element is shared. The content of the first item of the dist has been changed to "defg, hijk".

As described above, in FIG. 8, the document data is displayed in a form which facilitates watching by the user although it may be displayed in the forms shown in FIGS. 2 and 3, that is, with the document element punctuation symbols interposed. In this case, as shown in FIG. 12, the document element may be selected by dragging the entire content of the document element, or as shown in FIG. 13, the document element may be selected by dragging the entire document element.

Whichever form may be used for the display, when only a portion of the document element or the content of the document element is dragged, it may be determined that the document element was not selected and the sharing may not be effected, or a minimum document element which contains the selected range may be selected.

Since the content is shared, if the content of abstract of the article data 21 is changed to "defg, HIJK" for example, the content of the first item of the abstract data 22 is automatically changed to "defg, HIJK". On the other hand, if the content of the first item of the abstract data is changed, the content of the abstract of the article data is also changed.

Since only the content is shared, the shared portion may be laid out as "abstract" in the article document even after the sharing, and it may be laid out as "itemparagraph" in the abstract document. Namely, they may be displayed and printed out in the layouts which fit to the contexts of the respective documents.

[Embodiment 2]

In the Embodiment 1, the document data is explained as the object data in the memory although the present invention is not limited thereto. For example, other document content may be defined on the text data of FIG. 2 or FIG. 3.

For example, it is assumed that the content of each document element includes a text sequence of the content or a special command. The special command is "Yinput" which commands to read in a content of a file and has a file name as an argument.

Figures 14, 15:
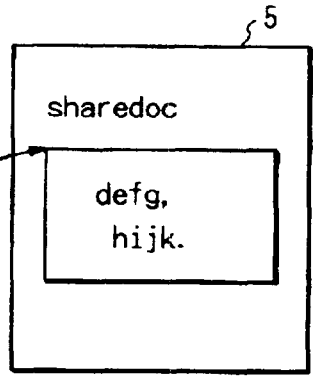
FIG. 14 shows an example of description of a document data.
FIG. 15 shows an example of description of a document data.

When the sharing of the Embodiment 1 is to be effected, text data is described as shown in FIG. 14. Namely, the "Yinput" command is placed at the position of the content of the document element <abstract> and a file "sharedoc" is specified. The file "sharedoc" stores "defg, hijk". In this manner, the content of the document element <abstract> may be defined to the content of the other document. In order to execute the "Yinput" command, a method used in a document shaping system TeX may be used. Similarly, the "Yinput" command is inserted at the position of the content of the document element <itemparagraph> of the first item of the abstract data to specify the same file. Thus, the contents of the document elements of the both documents are shared through the file "sharedoc".

The description may be made as shown in FIG. 15. The document data "defg, hijk" is previously defined and it is developed at the position of the content of the document element <itemparagraph>. This may also be implemented in the document shaping system TeX as a macro defining function. The description of the entity reference of the SGML also corresponds thereto. Namely, the definition may be made by previously describing that the entity "sharedoc" is "defg, hijk" and describing "&sharedoc;" instead of the content of the document. The "Yinput" command may be inserted between the document element start symbol and the document element end symbol and the content of the document element may be described in the file specified thereby. In this case, the object model of the Embodiment 1 may be attained by using the text description and the file.

Figure 16:
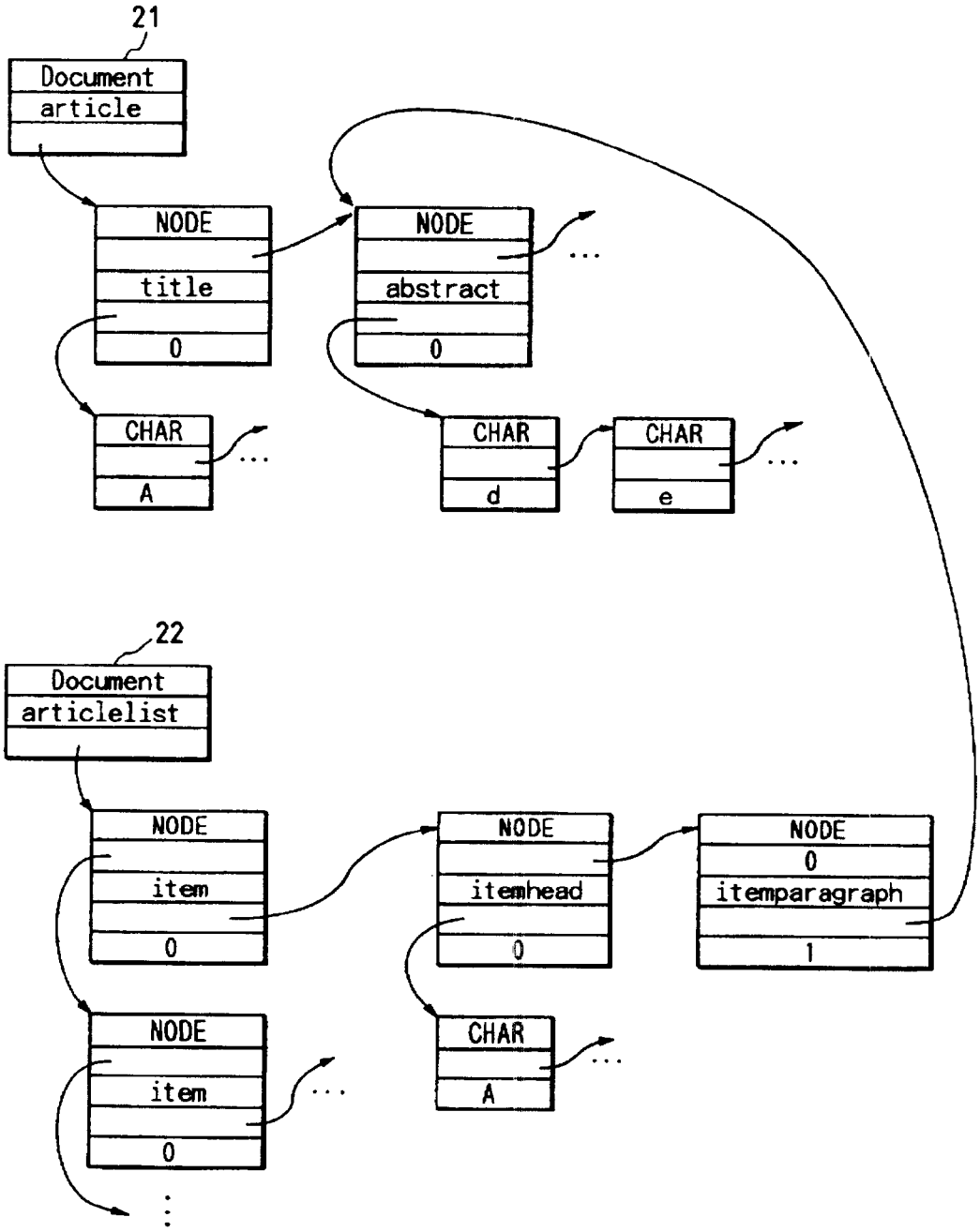
FIG. 16 shows an example of object data.
Figure 17:
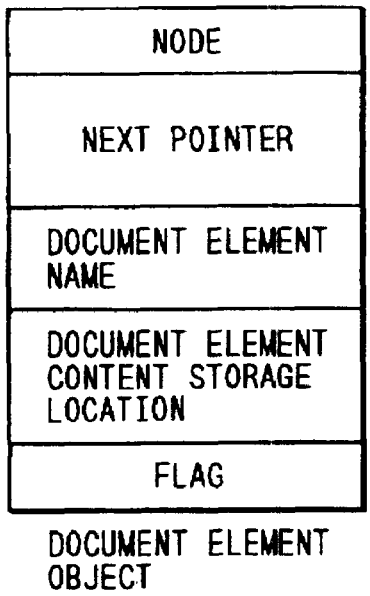
FIG. 17 shows a format of a document element object.

The object model may be that shown in FIG. 16 in which the document element <itemparagraph> indicates the document element <abstract> but it actually indicates the content of <abstract>. As shown in FIG. 17, the document element object is provided with a flag to selectively indicate the pointed object (sequence) or the content of the pointed document element object depending on the content of the flag of the document element object. In FIG. 16, when the flag is "1", it indicates the content of the pointed document element object. When it indicates the content of the pointed document element object, the process may be terminated at that point to prevent the sharing if the pointed object is the character object, or the flag may be neglected so that it indicates the object itself. In the Embodiment 1, when the document element content is shared, there is no distinction on the object model between the src and the dist, but in the present embodiment, the src and the dist are distinctive.

Figure 18:
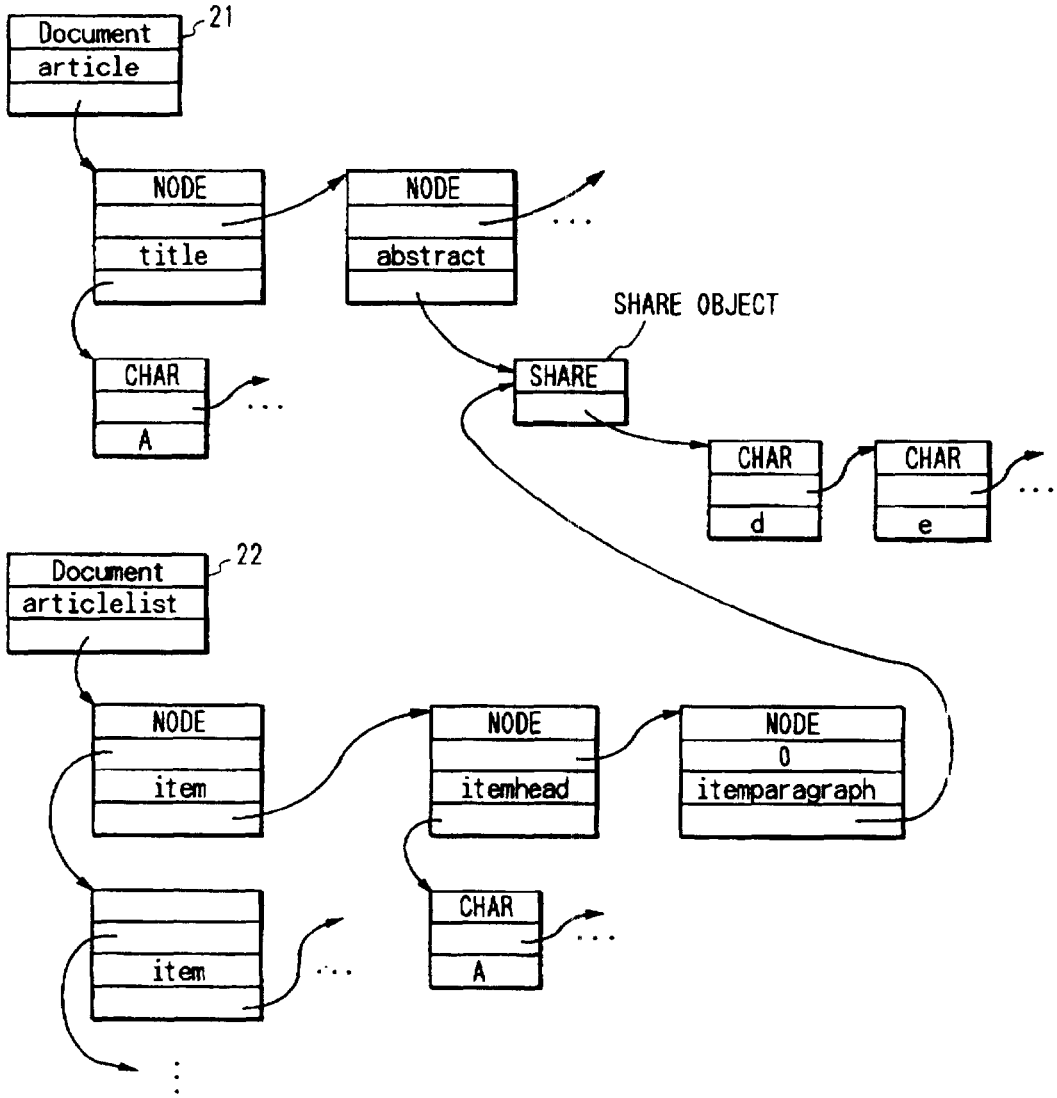
FIG. 18 shows an example of object data.

The sharing may be made through a share object. As shown in FIG. 18, a pointer to the share object is stored at the document element content storage location in the document element object having a shared content. The share object points the document element content to be shared. This may be an object model version of the "Yinput" command in that the pointed item is the document element content (object sequence) or a special element which is one share object.

[Embodiment 3]

In the Embodiment 1, the windows system is used as a user interface for the sharing. In the present embodiment, the sharing is made from a command line.

The system configuration, structured document data to be handled and format of the object are identical to those of FIGS. 1, 5 and 6 of the Embodiment 1.

When the sharing is to be made, the user enters "share ddd [i] [j] sss [k]" from the command line, where "ddd" is a document name of the dist, "sss" is a document name of the src, and "i", "j" and "k" are integers no smaller than 0, "ddd [i]" indicates the i-th object counted from 0 of the content of the document of the dist. Similarly, "ddd [i] [j]" indicates the j-th object of the content of "ddd [i]" when the object "ddd [i]" is the document element object. Only when all of ddd [i], ddd [i] [j] and sss [k] are the document element objects, the content of the document element object "ddd [i] [j]" is shared by the content of the document element object "sss [k]".

For example, in the Embodiment 1, the document element <itemparagraph> of the first item of FIG. 3 is represented by "ddd [0] [1]", and the document element <abstract> of FIG. 2 is represented by "sss [1]". When "share ddd [0] [1] sss [1]" is entered from the command line, the sharing of the document is effected as it is in the Embodiment 1. However, the sharing is not effected if any of ddd [i], ddd [i] [j] and sss [k] is a character object. The sharing is also not effected when the integer "i", "j" or "k" is too large. It may be processed as the last object of the document element content (object sequence).

An operation process of the present embodiment may be that of FIG. 7 of the Embodiment 1 with the omission of S701. In the document element detection steps S702 and S703, the number of objects of the document element content is counted. If the object other than the document element object is detected, the process is terminated to prevent the sharing.

In the present embodiment, since the windows system is not used, the system may be constructed without regard to the specification of the windows system.

[Embodiment 4]

In the present embodiment, the document element of the src is declared as a "share permitted document element", and in the dist, "to share that document element" is declared to share the content of the document element.

A system configuration, structured document data to be handled and an object format in the present embodiment are identical to those of FIGS. 1, 5 and 6 of the Embodiment 1 except that a share buffer 101 is provided in the storage 10.

The process in the present embodiment is divided into a process for declaring the share permission and a process for declaring the sharing.

Figure 19:
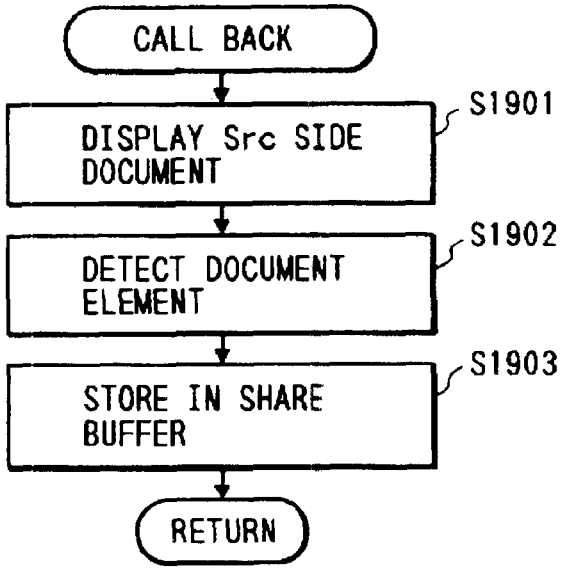
FIG. 19 shows a flow chart of a sharing permission declaration process.
Figure 20:
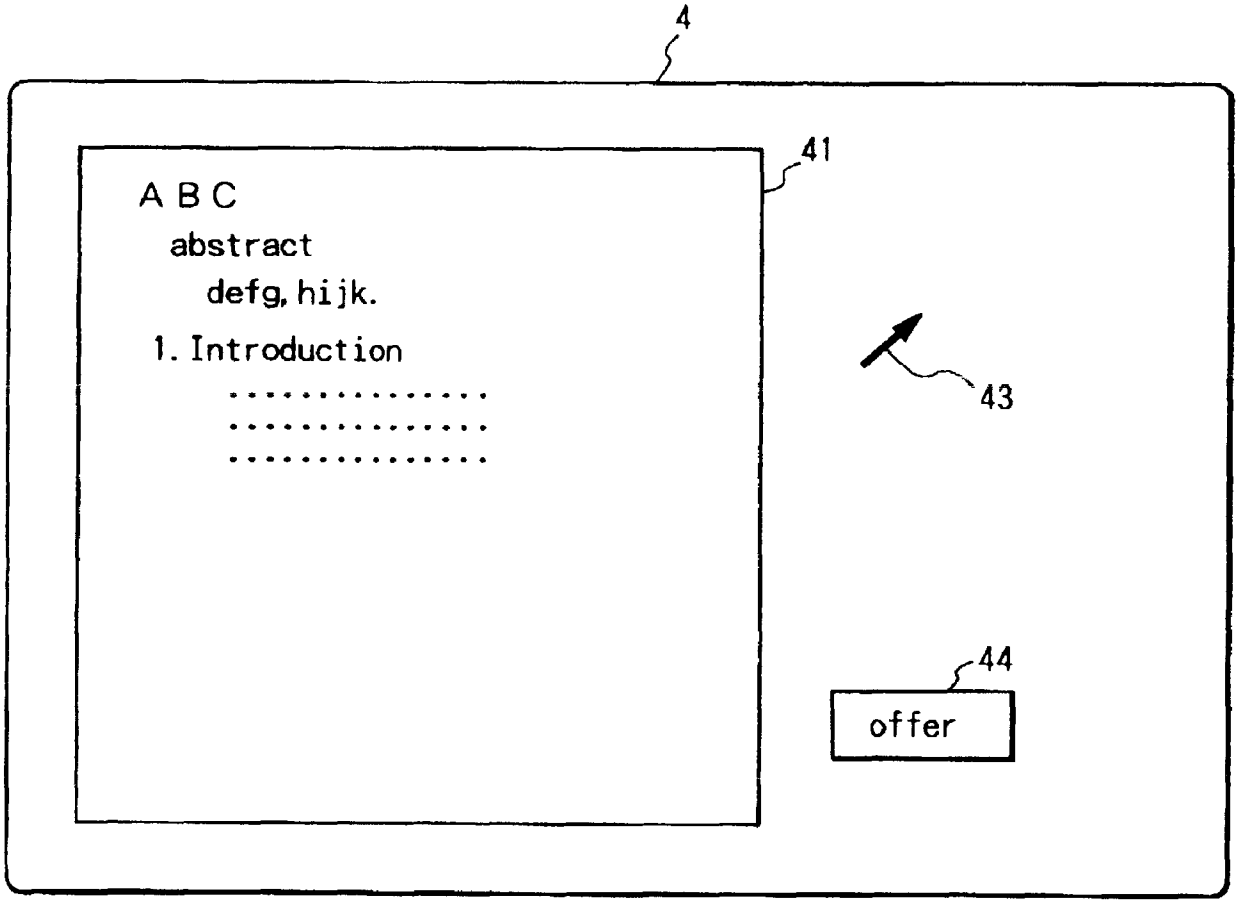
FIG. 20 shows an example of display at a time of the sharing permission declaration process.

FIG. 19 shows an event process when the share permission is declared. In a step S1901, a document of the src is displayed on the window 41. An example of display of the CRT 4 is shown in FIG. 20. Numeral 44 denotes a button which is displayed to indicate the share permission. When the user selects a document element by using the mouse 2, the system detects the document element in a step S1902, and when the user clicks the share permission button 44, the content storage location of the selected document element is stored in the share buffer 101 in a step S1903.

Figure 21:
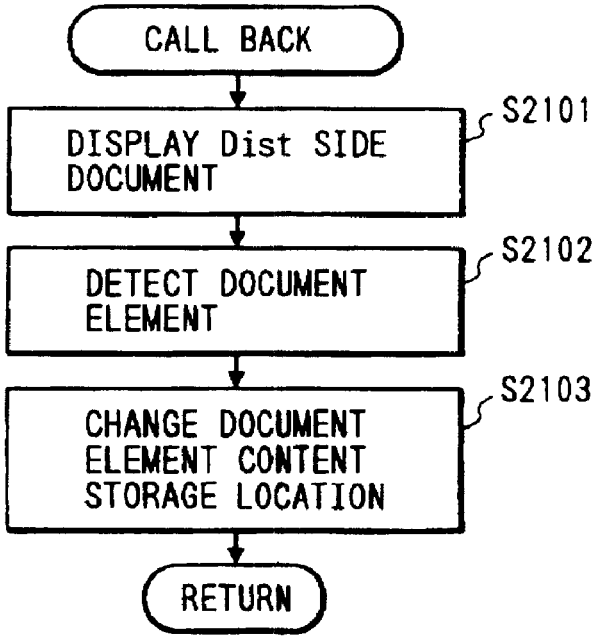
FIG. 21 shows a flow chart of a process for sharing a permitted content.

Referring to FIG. 21, an event process when the content permitted in the src is shared by the dist is explained. First, in a step S2101, a document of the dist is displayed on the window 41. In a step S2102, a document element selected by the user is detected, and when the share button 42 is clicked, the document content storage location of the document element object is changed to the content of the share buffer 101 in a step S2103. In the step S2103, if the share buffer 101 contains non-permitted value, for example, "0", the process is terminated and the sharing is not effected. The process of the present embodiment has thus been described.

In accordance with the present embodiment, when the contents of a number of document elements are to be shared by the content of one document element, the share permission is declared so that the pointers to the contents of the document elements are stored in the share buffer and the document element of the dist is detected. Accordingly, troublesome process of displaying both documents of the src and the dist and selecting the both document elements by the mouse are not necessary and the process is efficient. Further, in the share permission declaration, the provider of the sharing document may specify the portion to which the sharing is permitted so that undue sharing by others may be prevented.

[Embodiment 5]

In the Embodiment 4, the shared buffer is used, but in the present embodiment, the content storage location (pointer) of the document element for which the share permission was declared is stored in the share table.

A system configuration, structured document data to be handled and an object format in the present embodiment are identical to those of FIGS. 1, 5 and 6 of the Embodiment 1 except that a share table 102 is provided in the storage 10.

Figure 22:
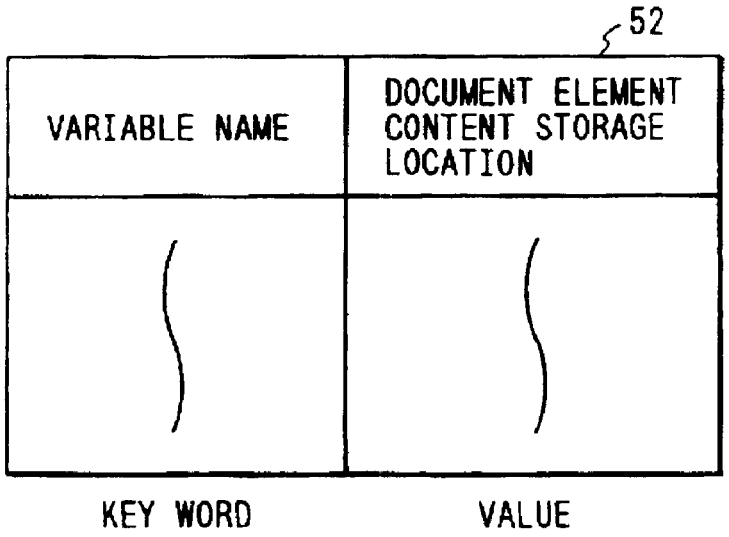
FIG. 22 shows a format of a share table.

FIG. 22 shows a format of the share table 102. The share table 102 is in a form of dictionary which comprises key words (variable names) and values (document element content storage locations).

Figure 23:
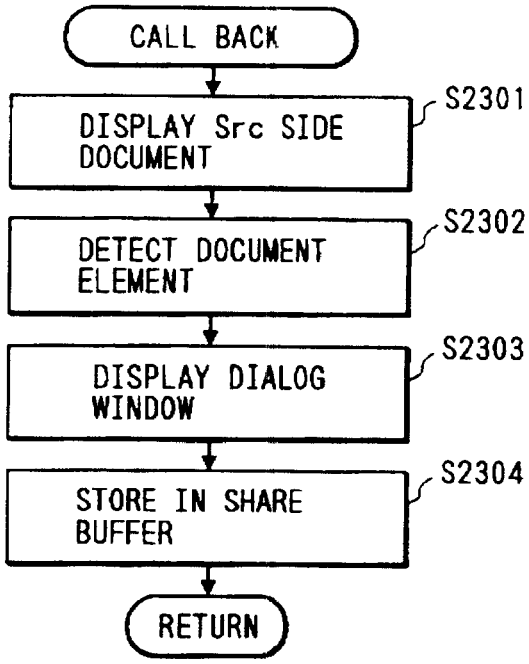
FIG. 23 shows a flow chart of a sharing permission declaration process.
Figure 24:
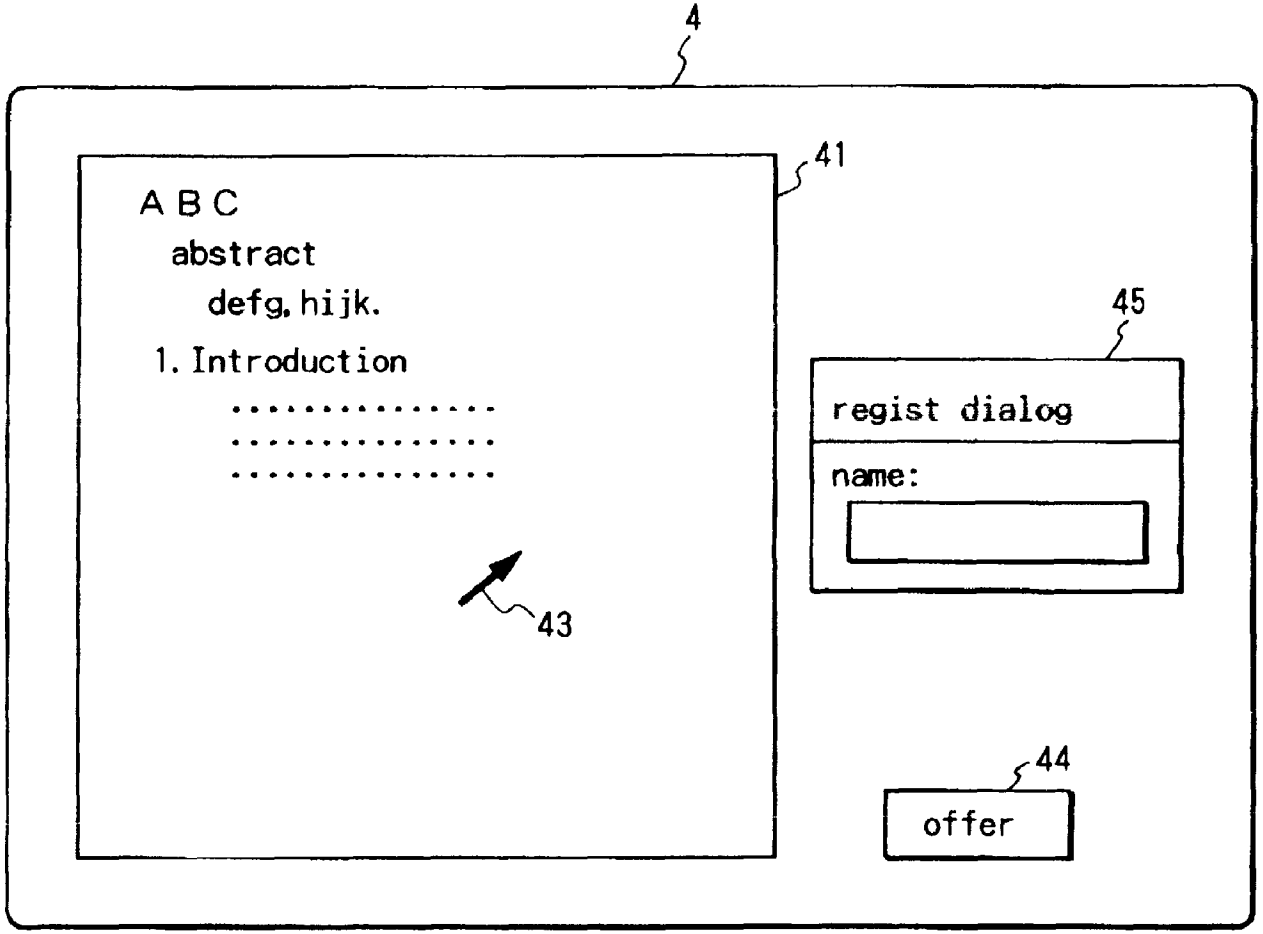
FIG. 24 shows an example of display at a time of the sharing permission declaration process.

FIG. 23 shows an event process when the share permission is declared. In a step S2301, a document of the src is displayed on the window 41. When the user selects a document element by using the mouse 2, the system detects the document element in a step S2302. When the user clicks the share permission button 44, a dialog window 45 is displayed on the CRT 4 in a step S2303. An example of display of the CRT 4 is shown in FIG. 24. When a variable name is entered from the dialog window 45, the content storage location of the document element selected in the step S2302 is stored in the share table 102 together with the variable name. If the same variable name has already been registered in the share table 102, the value thereof, that is, the document element content storage location is updated.

Figure 25:
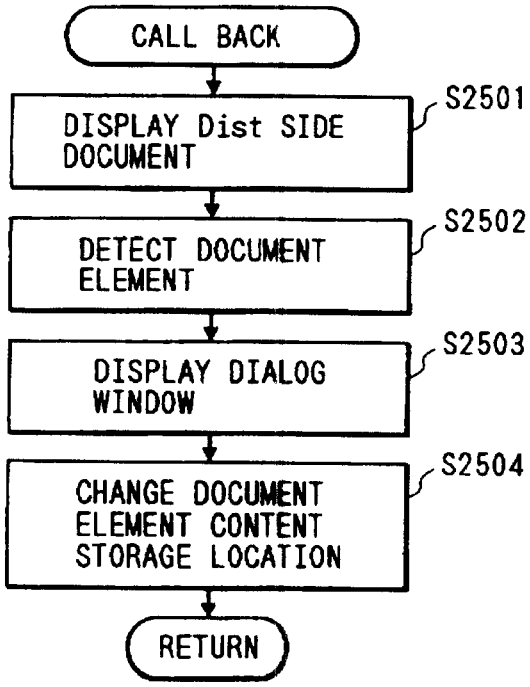
FIG. 25 shows a flow chart of a process for sharing a permitted content.

FIG. 25 shows a process for sharing.

Figure 26:
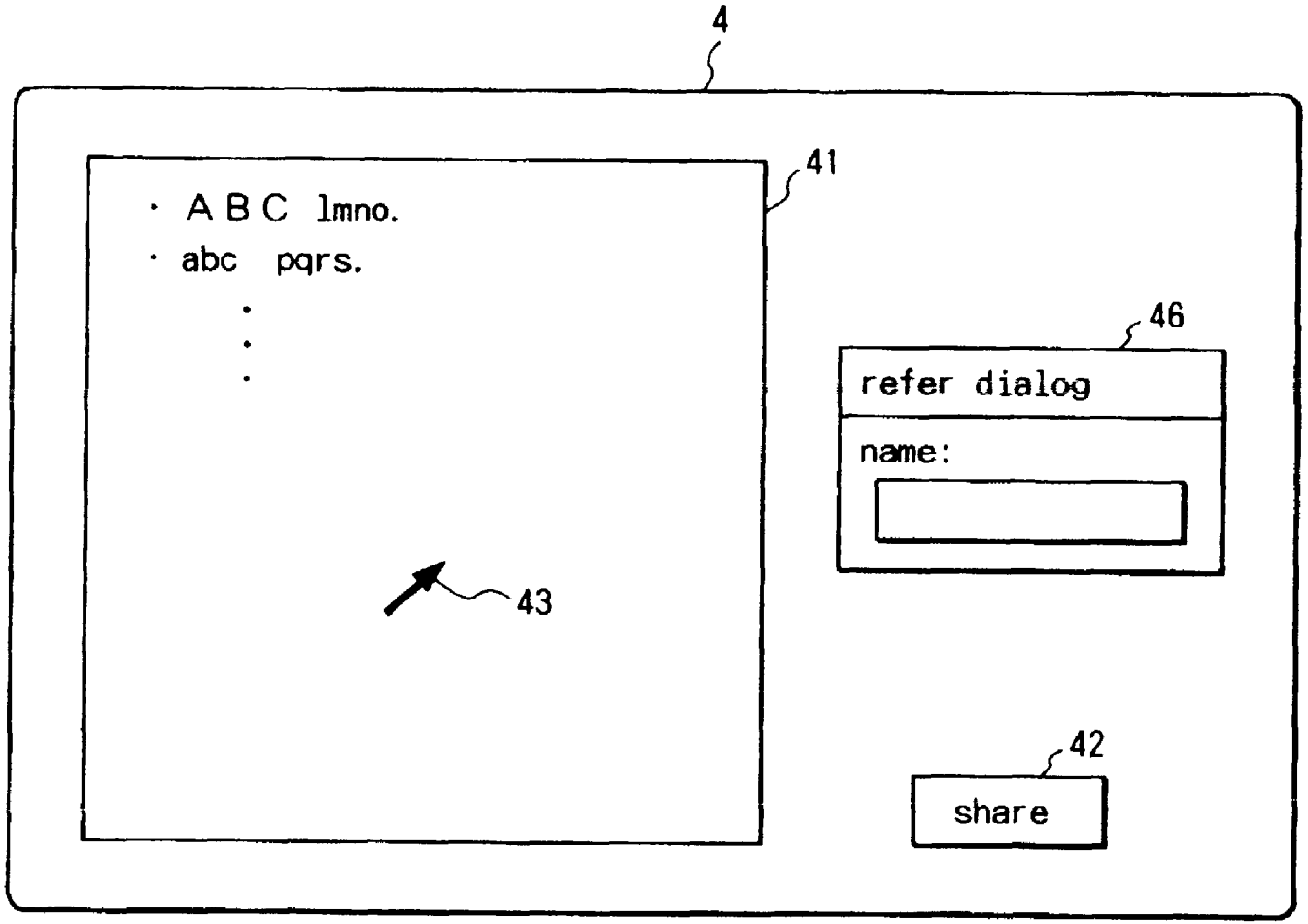
FIG. 26 shows an example of display of a dialog window.

In a step S2501, the document of the dist is displayed on the window 41. In a step S2502, a document element selected by the user is detected, and when the share button 42 is clicked, the dialog window 46 is displayed on the CRT 4 in a step S2503. An example of display of the CRT 4 is shown in FIG. 26. When the user specifies a variable name from the dialog window to indicate which document element content is to be shared, the document element content storage location (pointer) of the document element object selected in the step S2502 is changed to the value introduced from the share table 102 through the variable name, that is, the content of the document element content storage location in a step S2504. If the corresponding variable name is not detected in the share table 102 in the step S2504, the process is terminated and the sharing is not effected. The process of the present embodiment has thus been described.

In accordance with the present embodiment, the document element for which the share permission has been declared can be stored by using the document element content storage location as a variable and the shared document element can be selected through the variable.

In the embodiments described above, since the document element content is shared, the shared portion of the dist is changed when the shared portion of the src is changed so that the change may be made while keeping the consistency of the document. Other information than the document element such as the document element name is not shared but only the content of the document element is shared. Accordingly, even if the sharing is made with the document element of other document, the sharing may be attained without changing the logical structure of the document currently handled. Namely, in the article document, the shared portion may be handled as the abstract and in the abstract document, the shared portion may be handled as the itemparagraph. Accordingly, as shown in FIG. 11 of the Embodiment 1, it may be laid out as the abstract of the article document or the itemparagraph of the abstract document.

Figure 27:
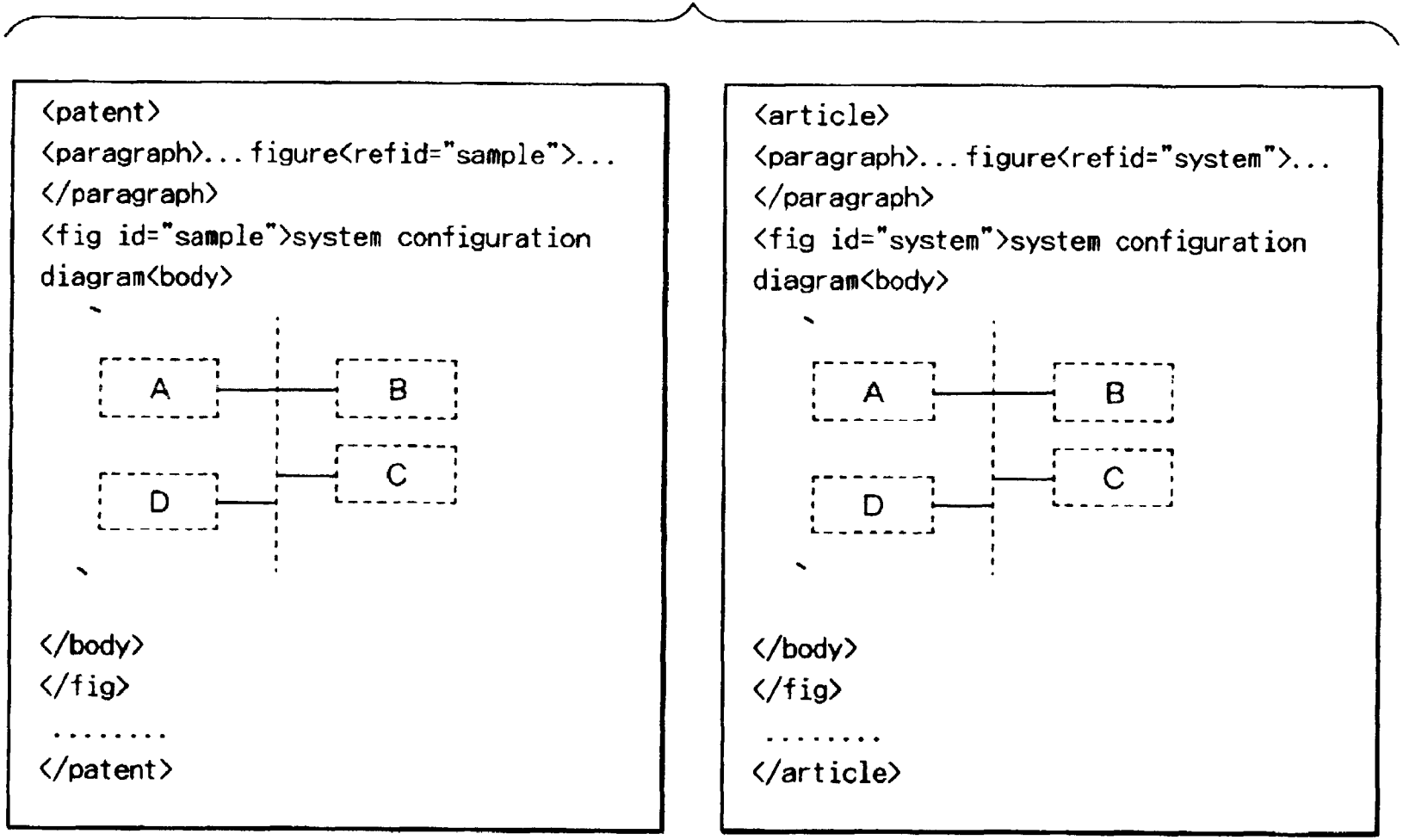
FIG. 27 shows an example of sharing of a document element having an attribute.

When the document element has an attribute, it may be changed without changing the attribute value as the document element name is. FIG. 27 shows an example thereof. In FIG. 27, a patent document and an article document are shown and both share a content of a document element <fig>. The document element <fig> has an ID assigned as an attribute. A document element <body> describes a drawing actually outputted. The drawing is drawn by sequentially outputting symbols (characters) surrounded by characters " ".

In FIG. 27, an ID "sample" is assigned to the document element <fig> of the document "patent", and an ID "system" is assigned to the document element <fig> of the document "article". When a figure number is to be entered to the fig, it may be referred by "<refid="sample">" in the document "patent" and by "<refid="system">" in the document "article". If the document element <fig> itself is shared with the document element <fig> of the document "patent" as the dist and the document element <fig> of the document "article" as the src, the attribute value of the document element <fig> of the document "patent" will be "system". Accordingly, in the document "patent", the reference by "<refid="sample">" cannot be attained and all values of "refid" must be updated. However, in the present embodiment, since only the content is updated without changing the attribute, the problem which is encountered in sharing the document element itself is avoided.

[Embodiment 6]

A system configuration of the present embodiment is identical to that of the Embodiment 1 except that the storage 10 is provided with a shared content separation program 15 instead of the content defining program 12. It is assumed that the document data is described in a text form and stored in a file. Article data 21 is stored by a file name "art" and abstract data is stored by a file name "abst".

Figure 28:
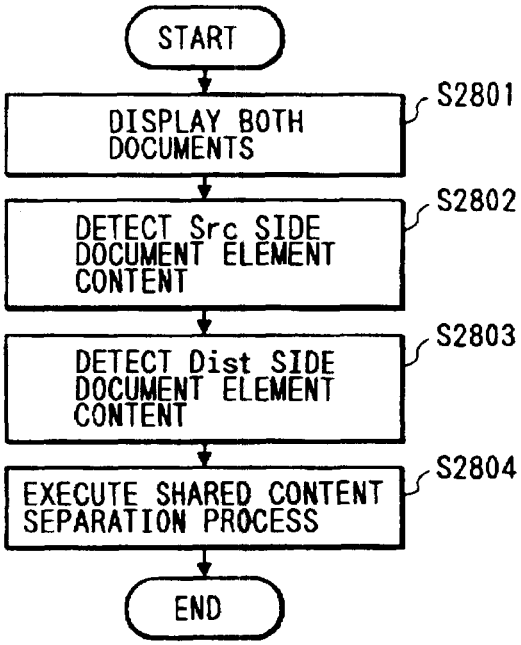
FIG. 28 shows a flow chart of content sharing process.

Referring to a flow chart of FIG. 28, steps S2801-S2803 are essentially identical to the steps S701-S703 of FIG. 7 except that the selection of the document in the step S2801 is effected by entering the file name and reading the file.

When the share button is clicked, the shared content separation process is started in a step S2804. Referring to a flow chart of FIG. 29, the process is explained. In a step S2901, whether the content of the document selected in the src is the shared data or not is determined. In the present embodiment, as will be explained later, the shared data is made independent from the document data. Accordingly, whether it is the shared data or not is determined by examining whether the description is to refer other data or not. If the content is not shared, it is the data of the article data 21 and the decision is "no", and the process proceeds to a step S2902. If the content is shared, the description is to refer the shared data in a step to be described later and the process proceeds to a step S2904.

In the step S2902, the content of the document element selected in the src is extracted, and it is stored in shared data area 23 (not shown) newly allocated to the auxiliary storage 20 as a storage location. In the present embodiment, "defg, hijk" is stored as the shared data 23. A file name of the shared data 23 is generated. For example, a numeral is added to the end of the document file name "art" of the src to generate "art01".

In a step S2903, the description is changed to refer the shared data 23 instead of the content of the document element selected in the src. For example, in the SGML, description of reference to entity may be used. In the document declaration portion, the entity is described to use the content of the file "art01" and "& art01;" is described instead of the document element content so that the content of the file referred to may be handled as the document data. Specifically, the portion "defg, hijk" of the article data stored in the file "art" is changed to "& art01;".

In a step S2904, the description is changed in the dist to refer the shared data 23 instead of the content of the selected document element as it is in the src. Specifically, the portion "lmno," of the article data stored in the file "abst" is changed to "& art01;".

In this manner, the content of the document element in the dist and the content of the document element in the src are shared by referring the same content separately stored. When the documents of the src and the dist which refer the content of the shared data 23 are subsequently redisplayed on the window 41, "defg, hijk" is displayed as shown in FIG. 9. When "defg, hijk" in the src which is shared with the dist is changed to "defg, HIJK", the content of the shared data 23 is changed to "defg,HIJK". Accordingly, when the document is redisplayed in the dist, the content of the changed shared data 23 is referred to so that the item 1 of the itemized document is changed to "[ABC]defg.HIJK".

[Embodiment 7]

In the Embodiment 6, the shared portion is selected in the src and the dist to effect the shared content separation process at the timing of the share command.

In the present embodiment, a first half of the shared content separation process is effected at the timing of the selection of the object to be shared in the src and the command to offer it as the shared data. The timing may be generated by depressing an "offer" button for commanding the offer.

Figure 29:
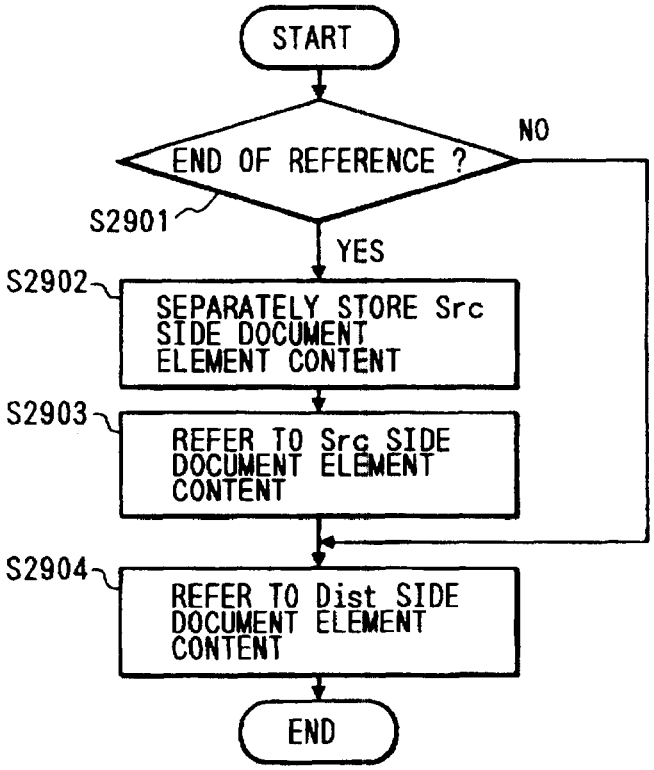
FIG. 29 shows a flow chart of a shared content separation process.

In this case, the steps S2901 to S2903 of the flow chart of FIG. 29 are executed. The reference address (for example, the file name of the shared data) is stored in the share buffer 24 (not shown) in the storage 20. A portion of the document in the dist whose content is to be rendered identical to that of the shared data is selected, and a latter half of the shared content separation process is effected at the timing of the command to share with the designated data. In this case, a step S2904 of the flow chart of FIG. 29 is executed. The reference address is that stored in the share buffer 24.

In accordance with the present embodiment, when the contents of a number of document elements are to be shared with the content of one document element, the share permission is declared so that the pointer to the document element content is stored in the share buffer, and the document element in the dist is detected. Accordingly, the troublesome process of displaying the both documents of the src and the dist and selecting the both document elements by the mouse is not necessary and the process is efficient.

Further, when the share permission is declared, the shared document provider may designate the portion to be shared to prevent undue sharing with others.

[Embodiment 8]

In the previous Embodiments 6 and 7, the document data is described in the text form and stored in the file. On the other hand, in the present embodiment, persistent data in a memory image form is stored in the object database.

Figure 30:
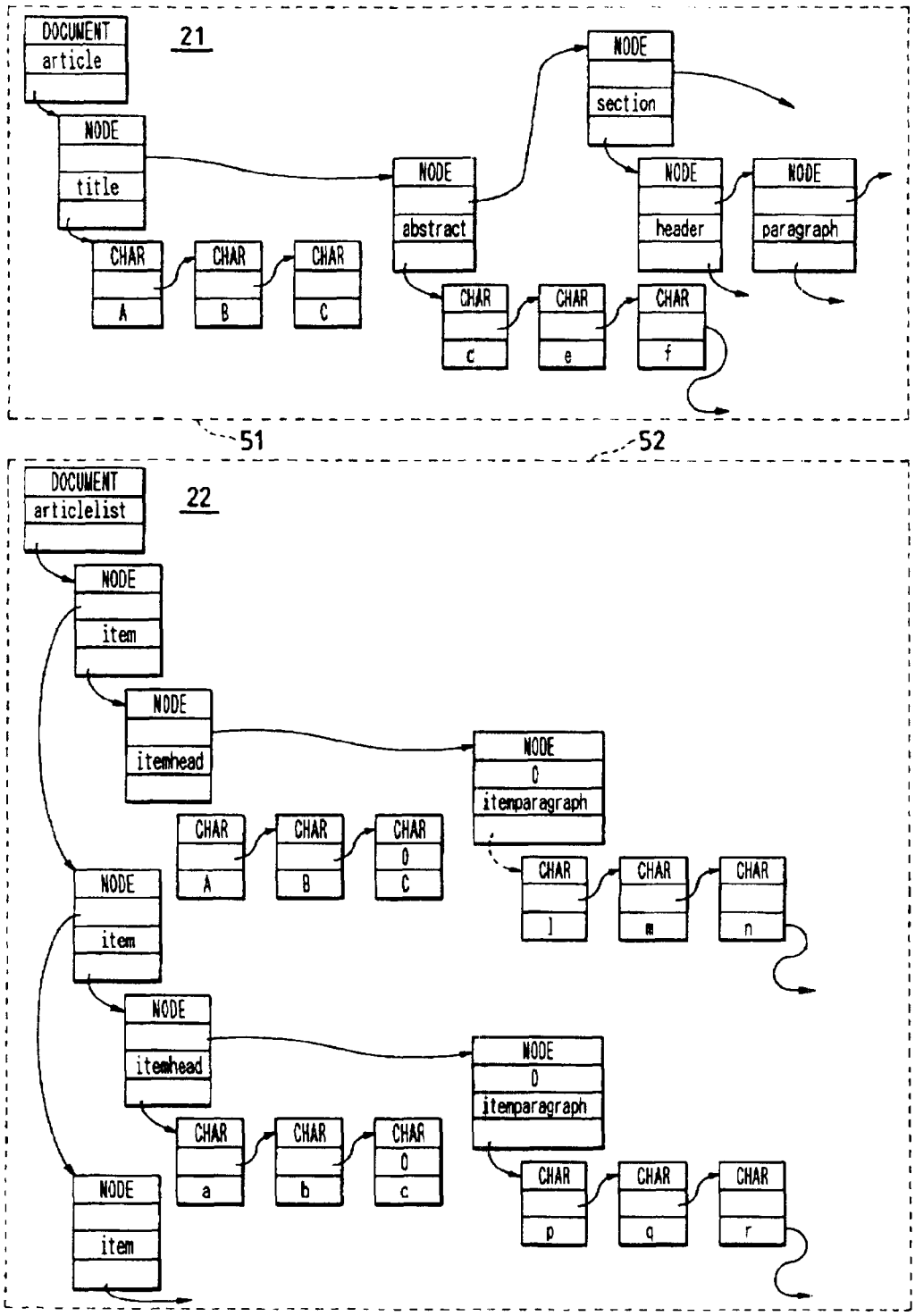
FIG. 30 shows an example of structured document data.

FIG. 30 shows the article data 21 and the abstract data 22 managed in the object database.

The article data 21 and the abstract data 22 are allocated to different segments 51 and 52 for management. Each document element data has an identification code. Data for a document route has an identification code "DOCUMENT" and an element name representing a type of the document. The article data has an element name "article". It also has a pointer to the content of the document. The pointer points to a document element which is a first content element.

The document element includes a composite document element having a content therein and a character element which is a terminal. The former has an identification code "NODE" and the latter has an identification code "CHAR". The composite document element has a pointer to a next element, an element name representing a type of element, and a pointer to a content of the element. A first document element has an element name "title", a pointer to a composite document element having a document element name "abstract" as a pointer to the next element, and a pointer to characters as the content. The character element has a pointer to the next element and a character code. The chaining of the pointers terminates when the pointer value is "0". The process of the present embodiment basically follows the flow charts of FIGS. 28 and 29 shown in the Embodiment 6 except that the method for referring the storage location and the method for changing are modified.

Figure 31:
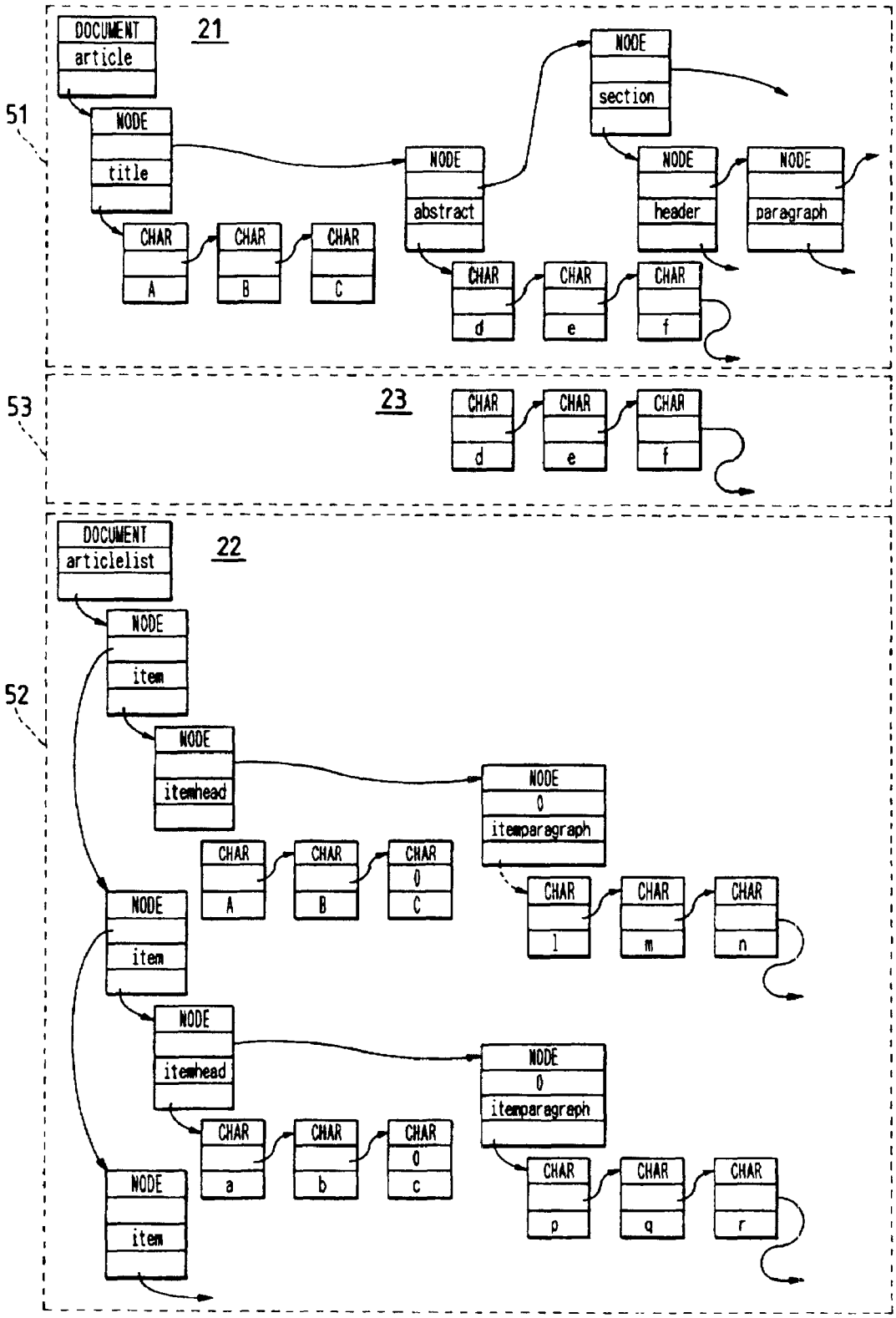
FIG. 31 shows a store condition having a shared content separated.

In a step S2901, whether the reference has been made or not is determined. If the data of the identical segment is pointed to, it is determined that the reference has not been made, and if the data of different segment is pointed to, it is determined that the reference has been made. If the reference has not been made, the process proceeds to a step 52902. In the separation storage, a new segment 53 is allocated and the content of the document element selected in the src is copied thereto. A transient data storage status of the database is shown in FIG. 31.

Figure 32:
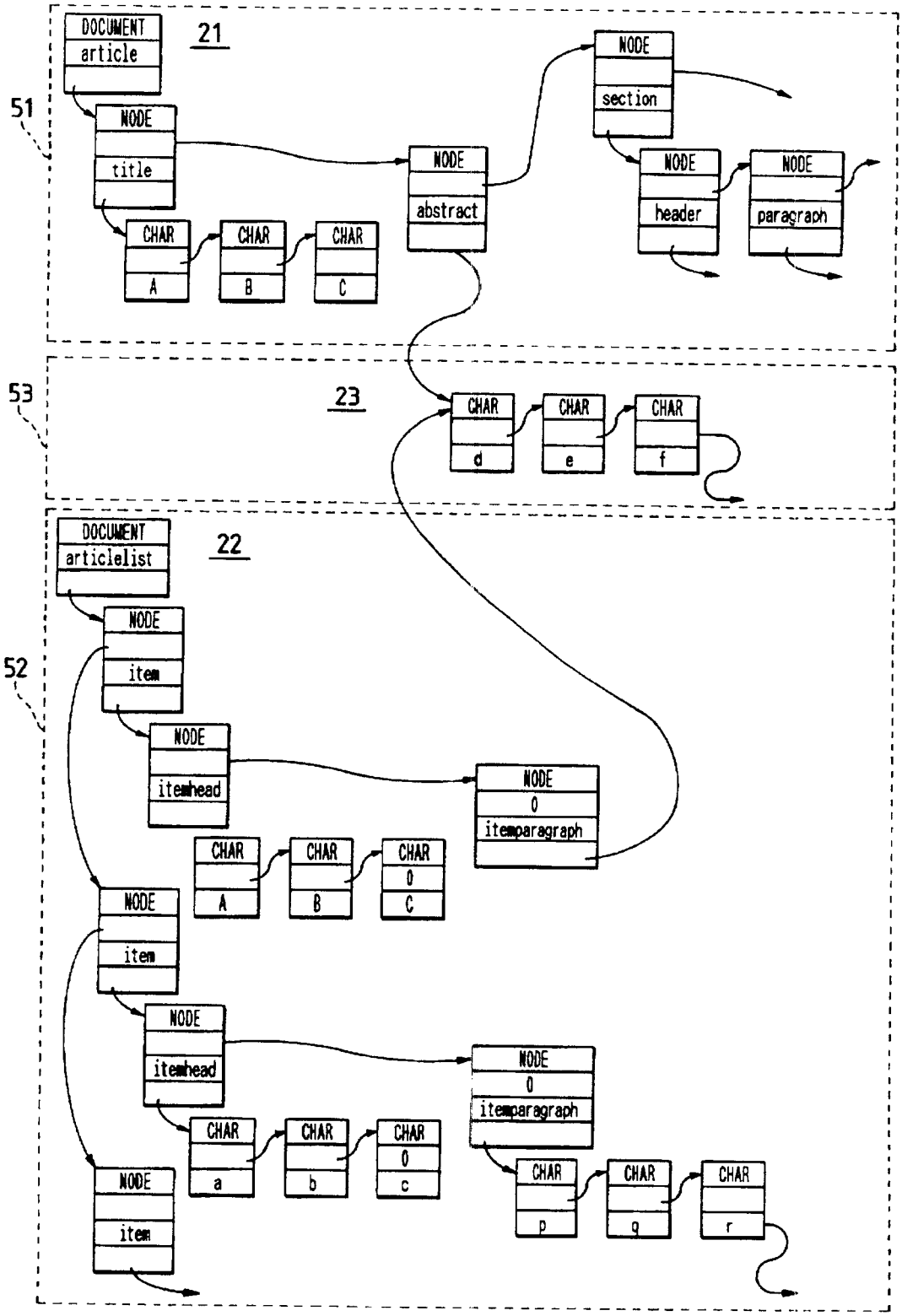
FIG. 32 shows an example of structured document data having a shared content.

In a step 52903, the pointer to document element content is replaced to the data in the newly allocated segment 53 in the src. In a step S2904, a pointer to the content of the document element selected in the dist is replaced to the data in the newly allocated segment 53. A storage status of the replaced database is shown in FIG. 32. If it is determined in the step S2901 that the reference has been made, the process proceeds to a step S2904 where the pointer to the document content of the dist is replaced. In accordance with the present embodiment, the processing speed is improved since the replacement is done by the memory image without using the file.

[Embodiment 9]

In the Embodiment 8, the respective documents are stored in different segments for management. The management may be made without changing the storage locations by affixing management information to the heads of the respective data.

Figure 33:
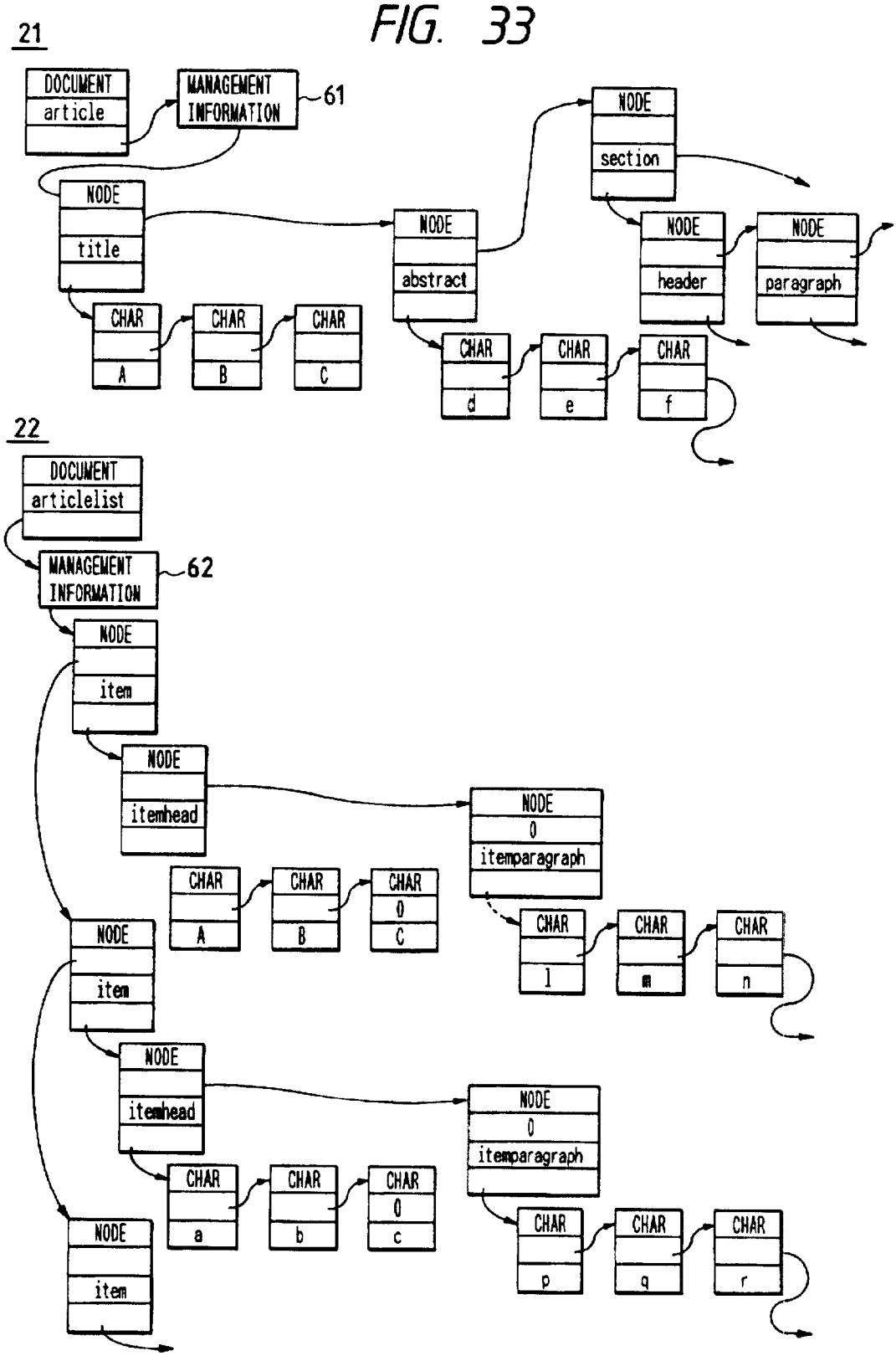
FIG. 33 shows an example of structured document data having management information.

FIG. 33 shows a data storage format having management information 61 and 62 affixed to the heads of a set of data.

Figure 34:
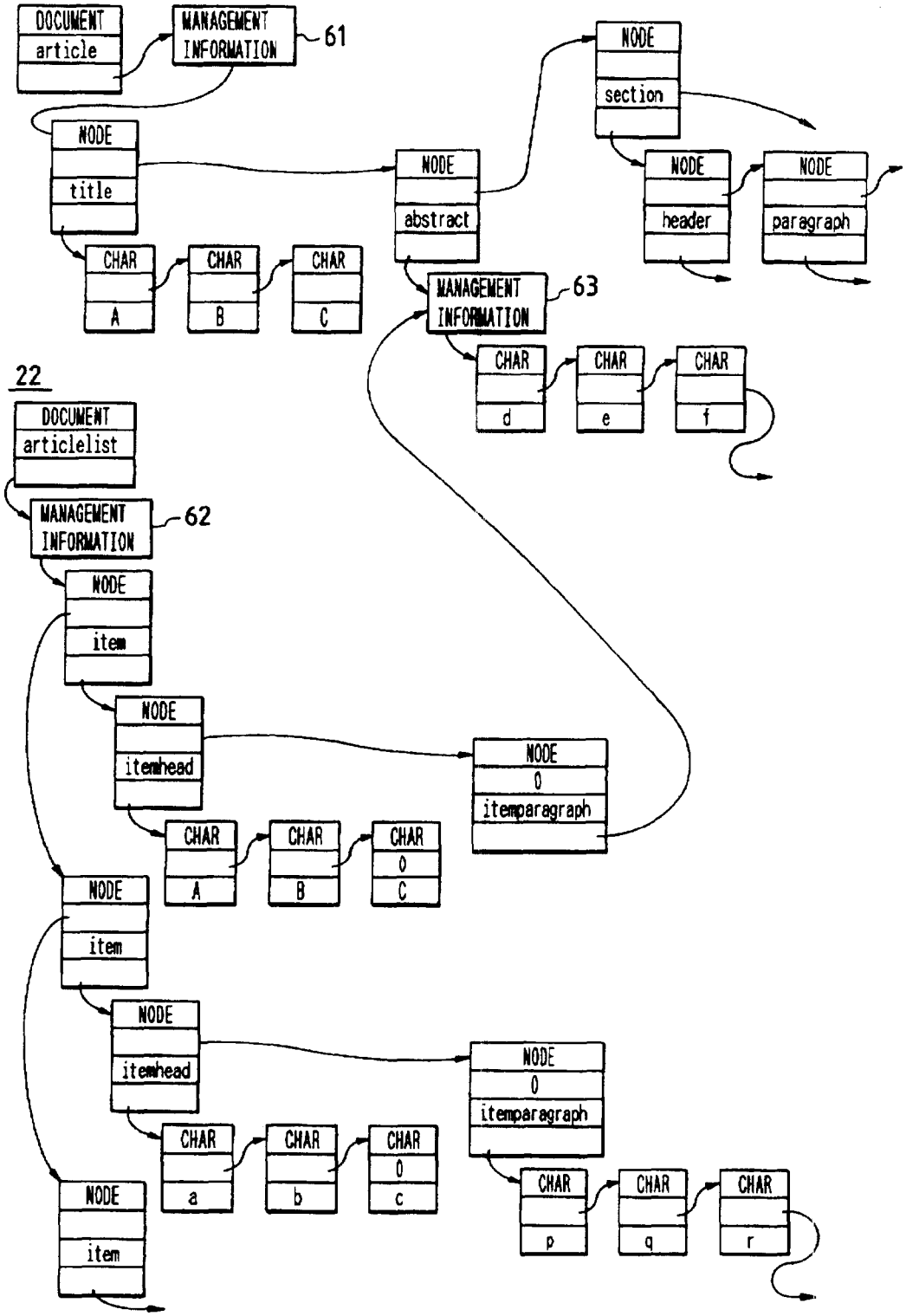
FIG. 34 shows an example of structured data having a shared content.

A process therefore is basically identical to that of the previous embodiment. In the shared content separation process, management information 63 is generated instead of the allocation of the new segment and the shared content is reconnected thereto, and the management information 63 is pointed from the document elements of the src and the dist. A result thereof is shown in FIG. 34. In the present embodiment, it is not necessary to change the data storage location and the sharing is attained by mere replacement of the pointer. Thus, the processing speed is improved.

In this manner, a plurality of document elements may share the same content while keeping the consistency of the content, and each document element may have the content to be shared with other in the document structure of each document element.

[Embodiment 10]

Figure 36:
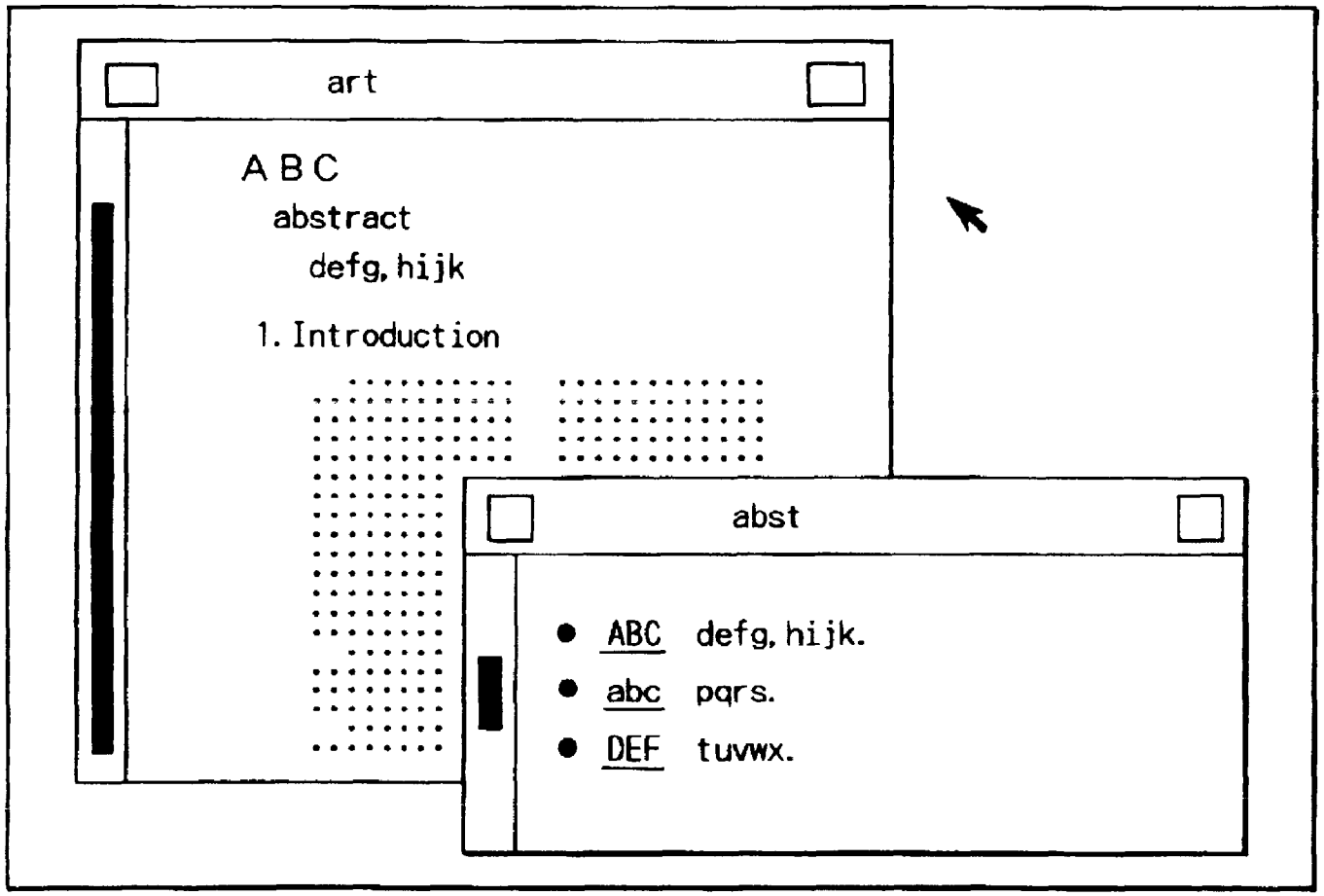
FIG. 36 shows an example of display of document data.

FIG. 36 shows a document with the shared document element. In this example, the article data and the abstract data share "defg, hijk". Since the identical data is not always shared, this display format cannot discriminate whether it is shared data or not on the display. When only one document data is displayed, it is not clear whether a certain portion is shared with other or not. As a result, the shared portion might be changed without knowing it so that other document might be inadvertently broken.

In the present embodiment, the document data is displayed while the shared portions and the non-shared portions are made identifiable.

Figure 35:
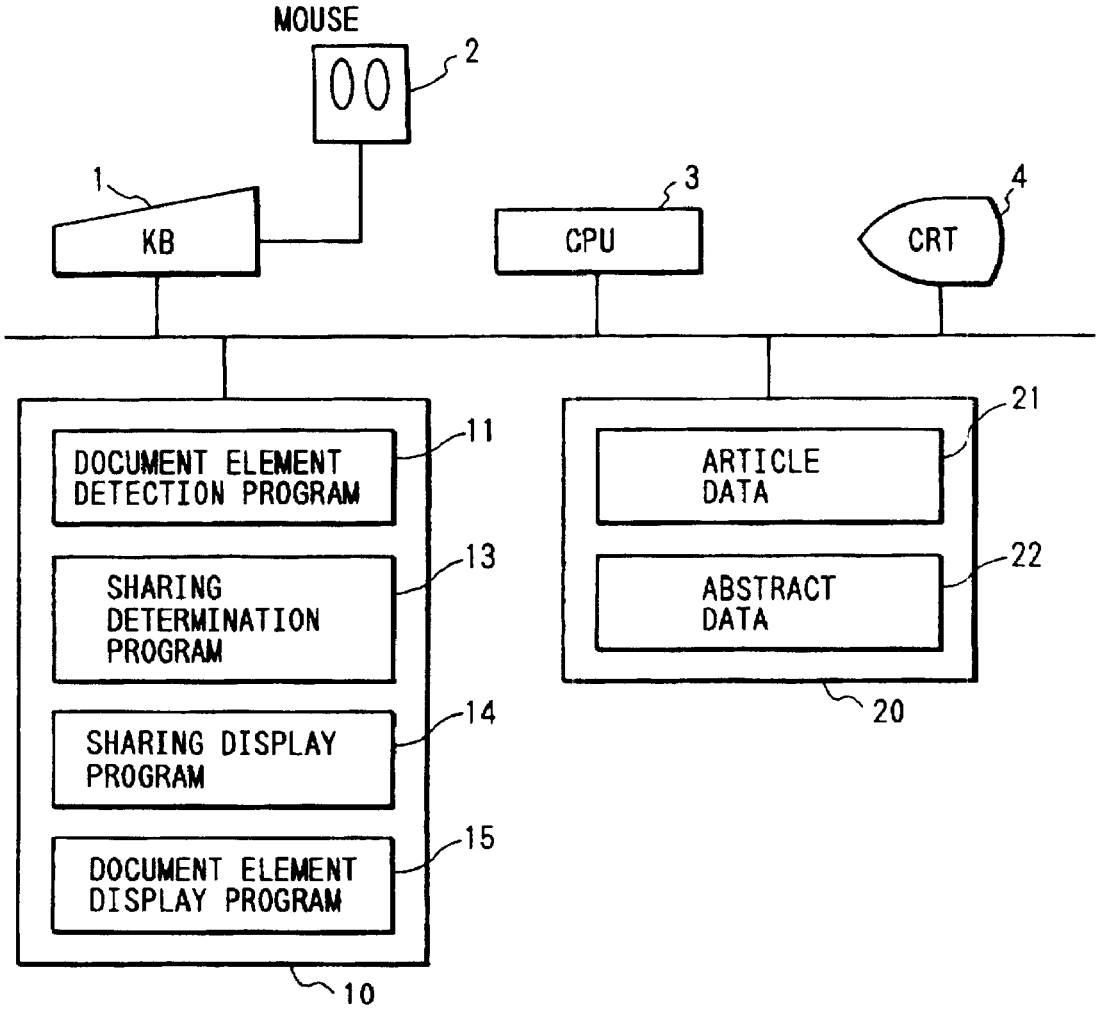
FIG. 35 shows a block diagram of a document processing apparatus of an embodiment.

FIG. 35 shows a system configuration of the present embodiment. The hardware configuration is identical to that of the Embodiment 1 except that the content defining program 12 is replaced by a sharing determination program 13, a sharing display program 14 and a document element display program 15.

Figure 37:
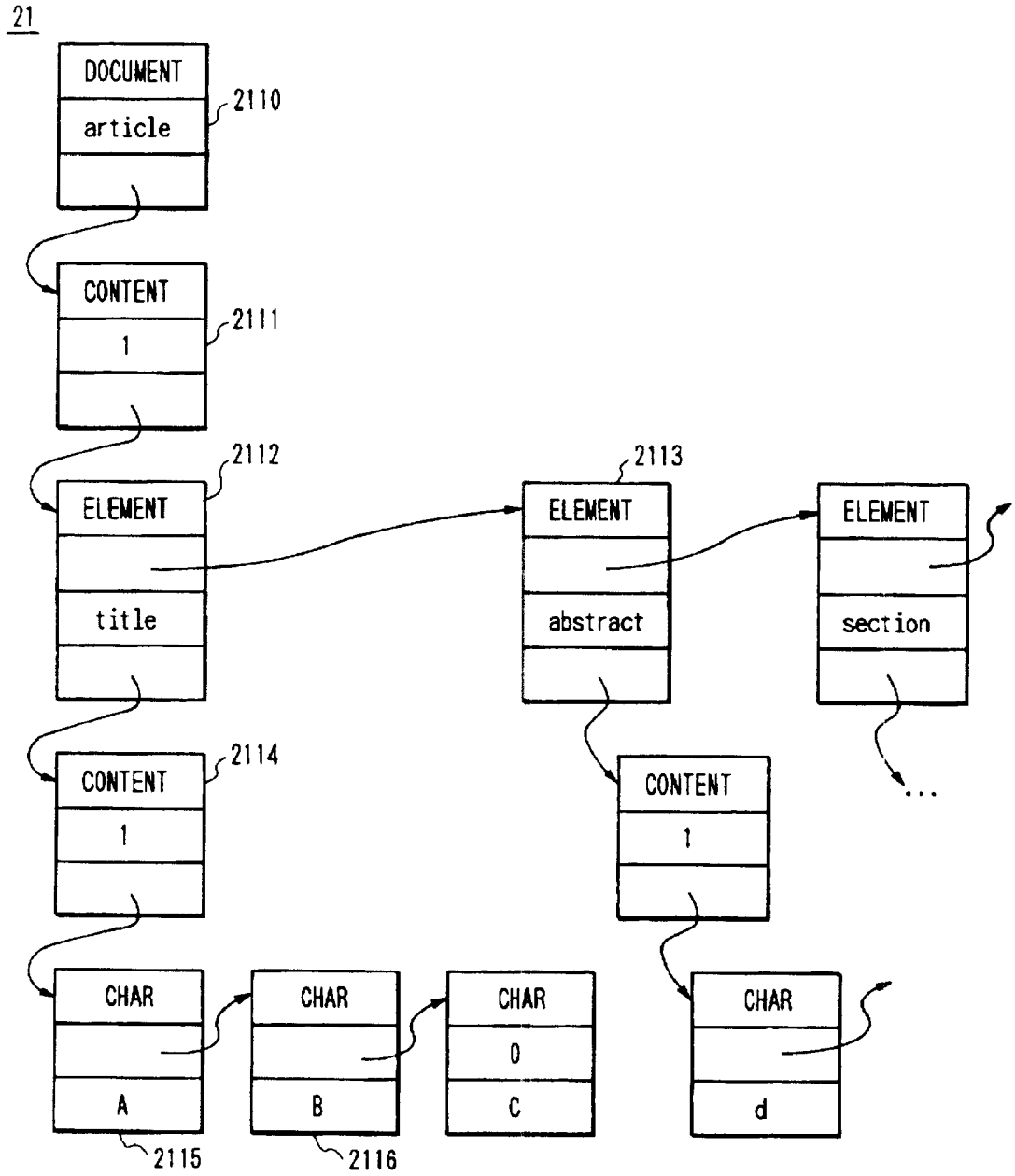
FIG. 37 shows a structure of article data.

FIG. 37 shows an example of the article data 21 managed in the object database. The abstract data 22 is also managed. The article data 21 has a document object 2110 as a route. The document object 2110 has an object type the "DOCUMENT", a document type "article" and a pointer to a document content object 2111 which represents the content of the document. The document content object 2111 has an object type "content", a reference count "1" and the substance of the content as a pointer to the head of the content. Document elements or a character sequence having staggered contents may be defined as the content. In the present example, the document content object 2111 points to a document element object 2112 which is the first element of the content. The reference count represents the number of document elements which points to the document content object as the content of the document element. Since the document element content object 2111 consists of the content of only the document object 2111, the reference count is "1".

The document element object 2112 has an object type "ELEMENT", a pointer to an element which represents a succeeding content and a pointer to an object which represents the content of the document element. In the present example, a document element object 2113 of the element name "abstract" is pointed as the succeeding content, and a document element content object 2114 is pointed. The document element content object 2114 points to a character object 2115 which is the content of the head as the substance of the content.

The character object 2115 has an object type "CHAR", a pointer to an element which is a succeeding content and a character code "A". A character object 2116 having a character code "B" is pointed as the succeeding content.

Figure 38:
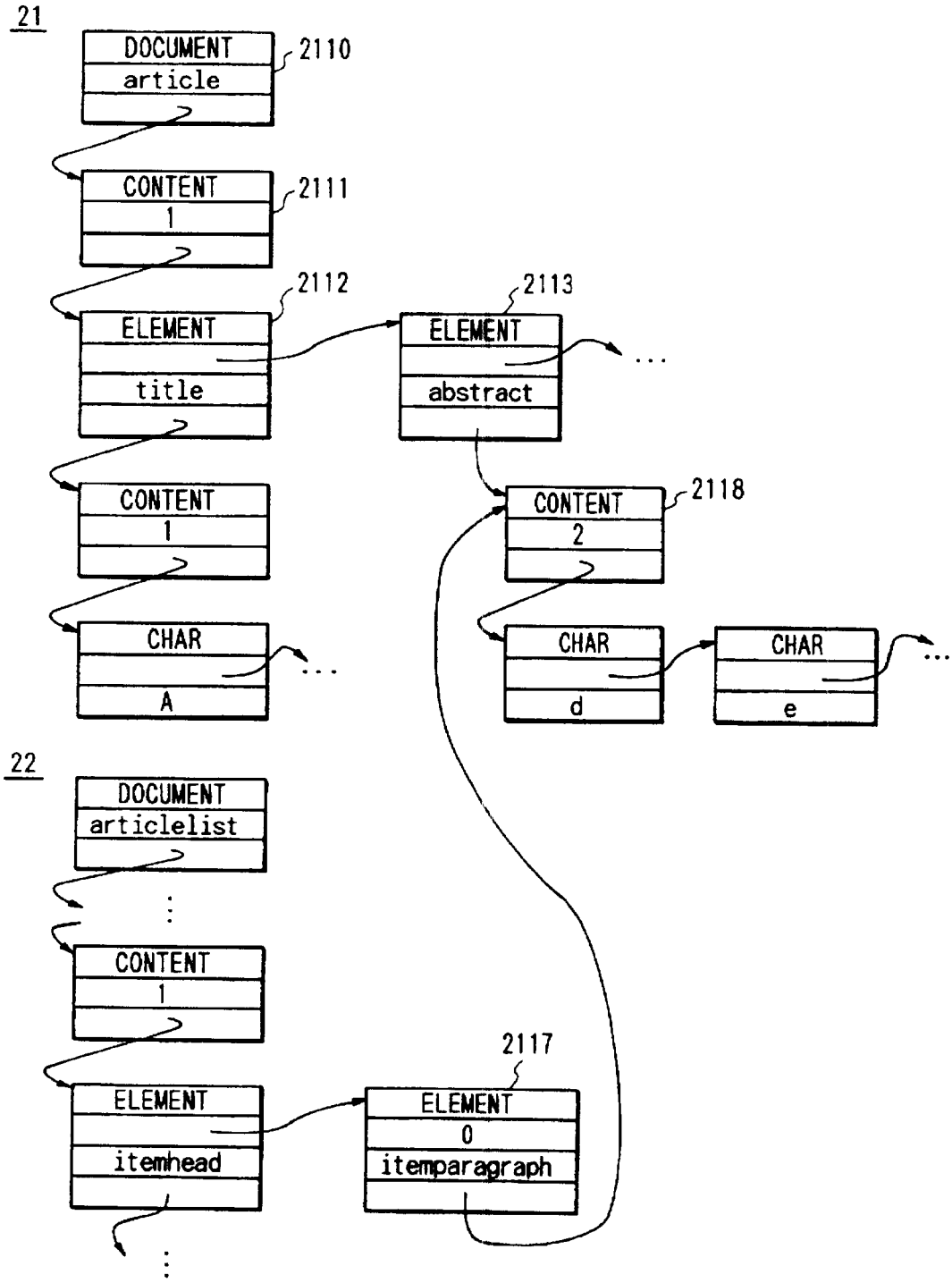
FIG. 38 shows a structure of abstract data.

In the present embodiment, it is assumed that the content of the document element of the document element name "abstract" of the article data and the content of the document element of the document element name "itemparagraph" which first appeared in the abstract data are shared. The article data format and the abstract data format are shown in FIG. 38.

A document element content object 2118 which indicates "defg, hijk" is pointed by both of the document element 2113 of the element name "abstract" of the article data and the document element 2217 of the element name "itemparagraph" first appeared in the abstract data. A reference count of a document element content object 2118 is "2".

Figure 39:
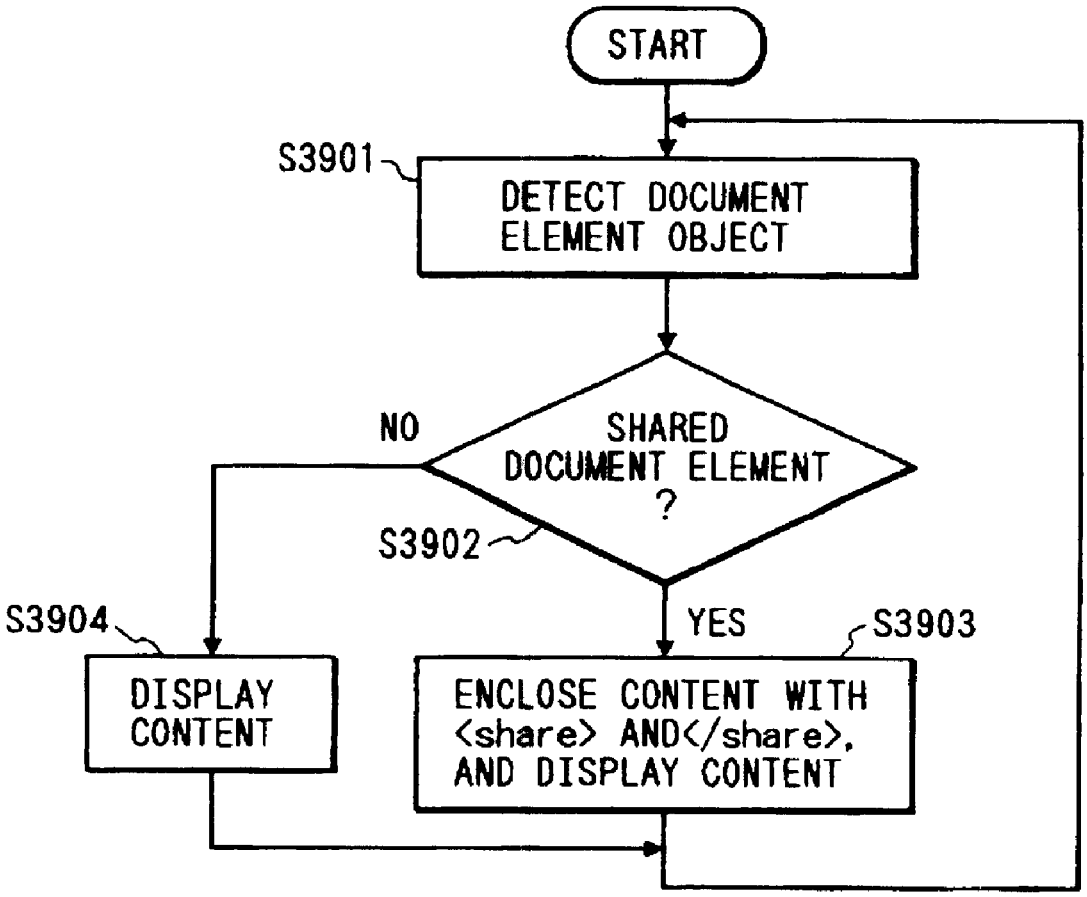
FIG. 39 shows a flow chart of a document display process.

Referring to a flow chart of FIG. 39, a document display process of the present embodiment is explained. The display of the abstract data 22 shown in FIG. 38 is explained.

First, the abstract data 22 is scanned. In a step S3901, a document element object is detected. If it is not detected and the document data is over, the process is terminated. In a step S3902, the sharing determination program 12 is used to determine whether the content of the detected document element is shared with other document element content. This is determined by examining whether the reference count of the document element content object pointed by the document element object is two or larger or not. If it is two or larger, it means that the contents are shared. If the sharing is detected in the step S3902, the process proceeds to a step S3903 where the shared portion is displayed by the sharing display program 14. First, a character sequence "<share>" is displayed and then the document element contained is displayed. The display and the printout of the document element content in a certain layout may be implemented by the prior art SGML technology. Finally, a character sequence "</share>" is displayed to terminate the sharing display process. On the other hand, if the sharing is not detected in the step S3902, the process proceeds to a step S3904 where the mere document element content is displayed. The process returns to the step S3901 to execute the detection of the next document element. The process has thus been described.

FIG. 40 shows a display of the abstract data 22. Since the content of the shared document element is surrounded by the character sequence "<share>" and "<share>", the shared portion can be readily identified.

A shared document element might be in the content of a shared document element, that is, the shared portion might be nested. For example, it is assumed that the shared document element content includes an enhanced document element which is shared with a portion of an index in the article data. This is illustrated in FIG. 41.

Figure 41:
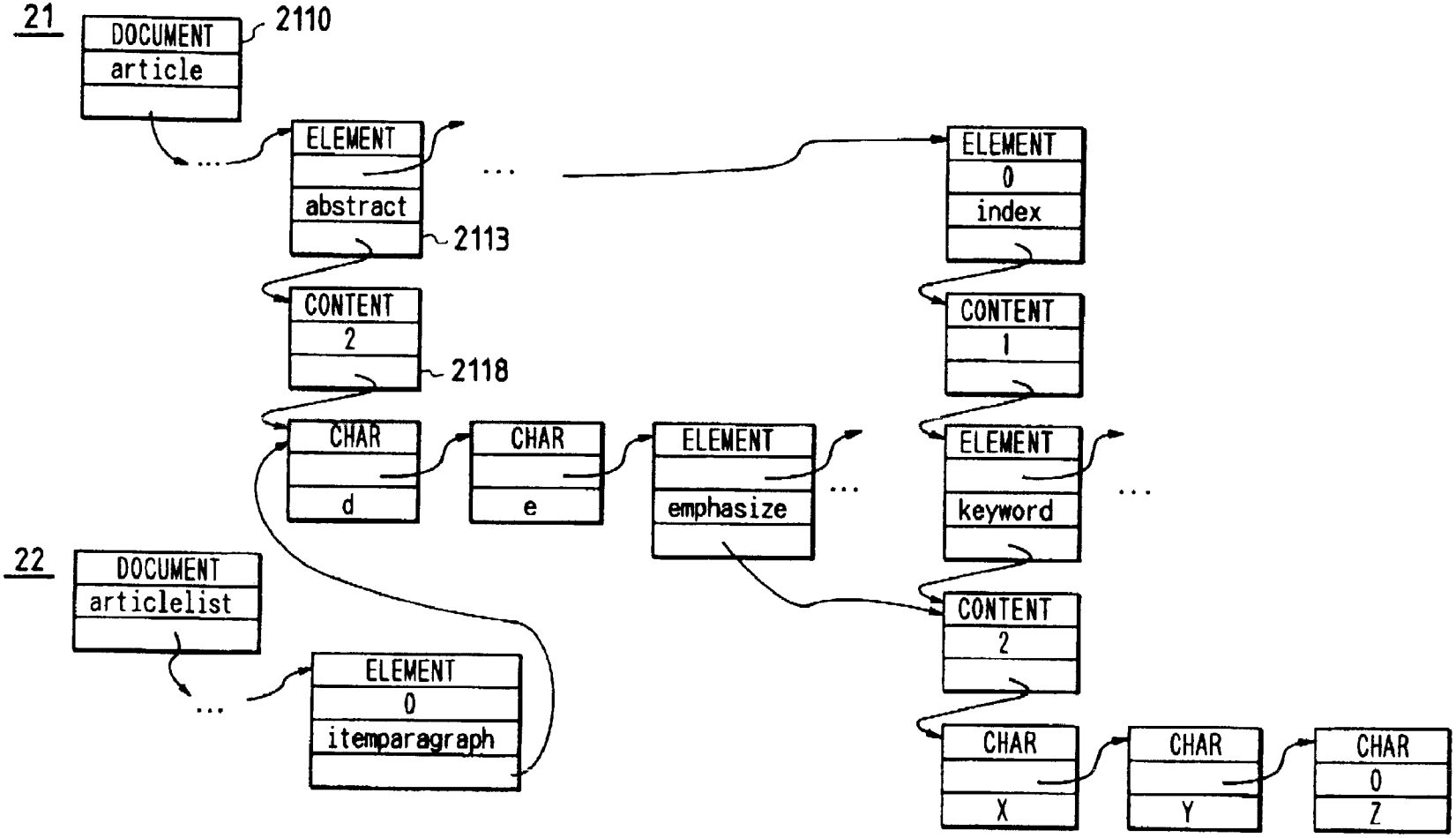
FIG. 41 shows an example of a nesting structure of shared elements.

FIG. 41 indicates that a document element of a document name "emphasis" is present between "e" and "f" of a shared document element content "defg, hijk", and a content "XYZ" thereof is shared with a content of a document element of a document element name "keyword" in the index of the article data.

The sharing display program 13 may display the character sequence "<share>" as well as the depth of sharing. For example, it is displayed as shown in FIG. 42. In FIG. 42, the depth of the sharing nesting is displayed by representing the character sequences "<share>" and "</share>" as "<share1>", "</share1>", "<share2>", "</share2>". This may be implemented by providing a sharing nesting counter 103 (not shown) in the storage 10 to manage the depth of the sharing. When the content of the shared document element is displayed, it may be surrounded by special characters such as "◇" and "◆". The depth of the sharing nesting may be represented by the number of continuous special characters. When the document data is displayed in a fully marked-up form of the SGML, the use of the special characters to surround the shared portion will facilitate the watching. An example of display is shown in FIG. 43.

[Embodiment 11]

In the present embodiment, a background color of the shared portion is changed on the display. A system configuration and document data in the present embodiment are identical to those of FIGS. 35 and 37 of the Embodiment 10.

Figure 44:
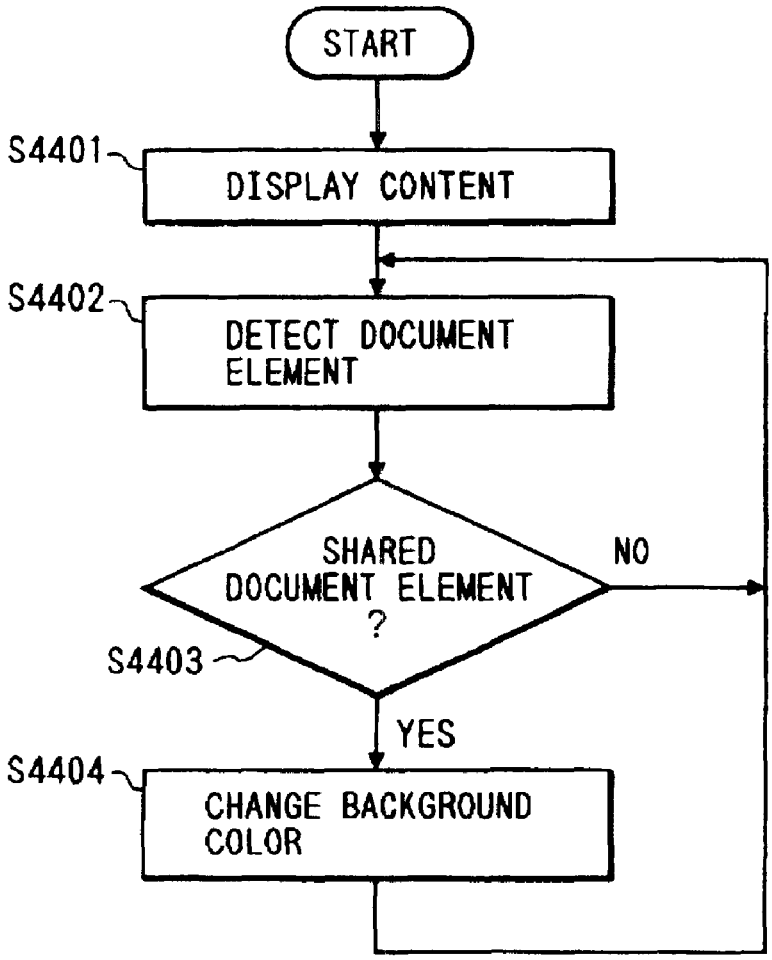
FIG. 44 shows a flow chart of a document display process.

Referring to FIG. 44, a process is explained. In a step S4401, the abstract data 22 is displayed on the CRT 4. In a step S4402, a document element is detected from the abstract data 22. In a step S4403, whether the document element content is shared by other document content or not is determined. The determination method is identical to the step S3902 of the Embodiment 10 in FIG. 39.

Figure 45:
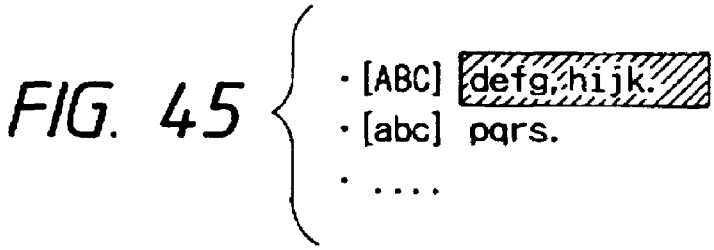
FIG. 45 shows an example of display of document data.

In a step S4404, the background color of the shared document element content portion is displayed in yellow, for example. Preferably, it is distinguished from a color for designating a range by dragging. The association of the document element object in the memory to the range of the displayed document content may be implemented by a structure edit of the SGML. The change of the background color is implemented in the X window program. An example of display is shown in FIG. 45. In FIG. 45, the yellow background area is hatched. Instead of changing the background color as is done in the present embodiment, a foreground color may be changed.

When a color display is not used, an underscore may be drawn to the displayed shared document element content. Where a bit map display is used, it may be surrounded by a frame. When the sharing nesting is present, the background color may be changed depending on the depth of the sharing nesting.

In the present embodiment, since the special characters or character sequences other than the content information are not included in the displayed document, the difficulty in reading the document data is avoided. Further, whether it is the shared document element or not may be readily determined without checking the beginning or the end of the document element content.

In accordance with the embodiments described above, whether the portion of the document element content is shared with the content of other document element or not can be clearly determined. Accordingly, the portion which, when it is changed, will affect to other document can be clearly identified and undue change of the content to break the other shared document can be prevented.

[Embodiment 12]

In the above embodiment, the shared portion and the non-shared portion are distinguished when the document is displayed. In the present embodiment, the shared portion is informed to the operator when it is selected for edition.

Figure 48:
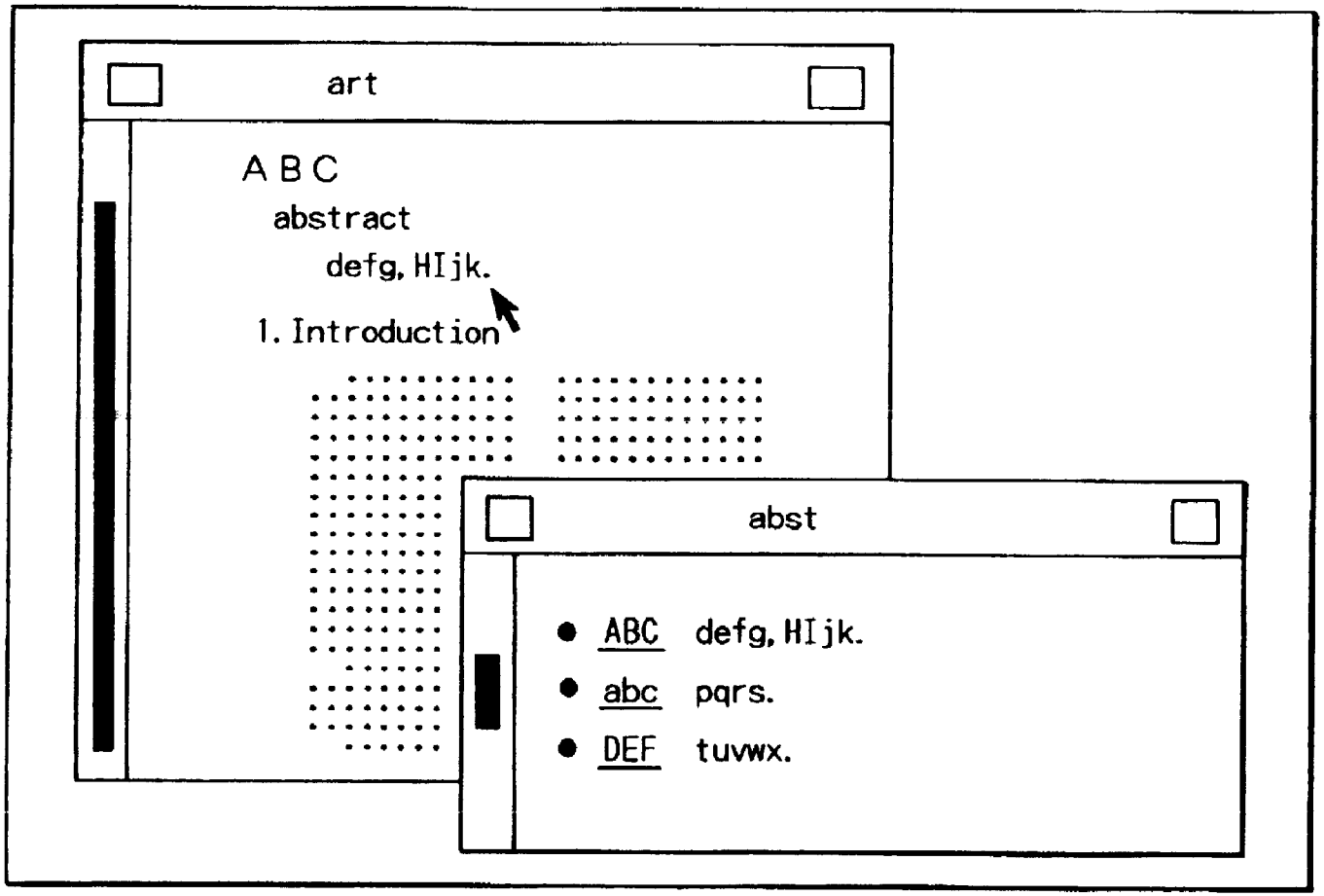
FIG. 48 shows an example of display when a shared portion is edited.

It is assumed that while a display of FIG. 36 is made, "de" of "defg, hijk" of the document "art" is selected. This may be implemented by dragging the character sequence by the prior art mouse, and the selected portion is displayed in a distinguishable manner. An example of display is shown in FIG. 48 in which the selected area is hatched.

A character sequence, for example, "HI" previously copied in a common area such as a clip board is substituted by so-called pasting to change "defg, hijk" to "defg, HIjk". As shown in FIG. 48, "defg, hijk" of the document "abst" is also changed to "defg, HIjk". The change for other portions may be implemented in a similar manner.

Figure 46:
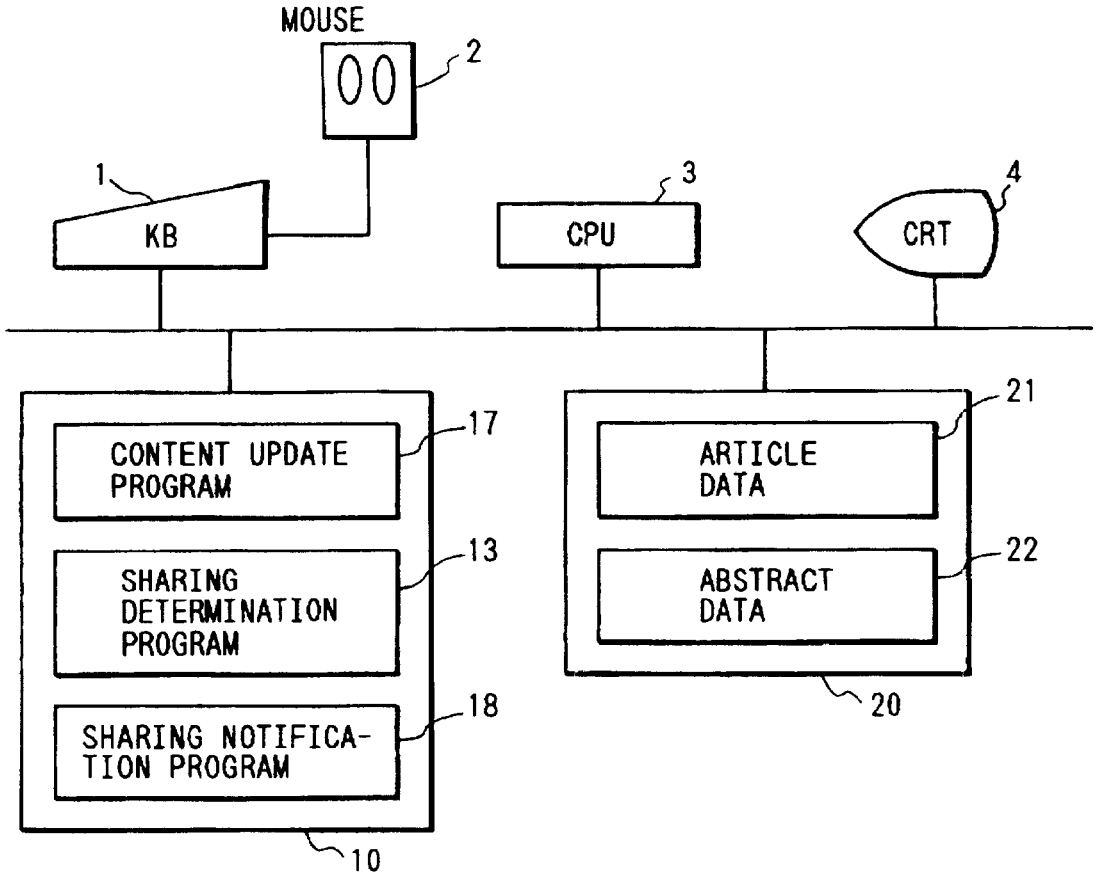
FIG. 46 shows a block diagram of a document processing apparatus of an embodiment.
Figure 47:
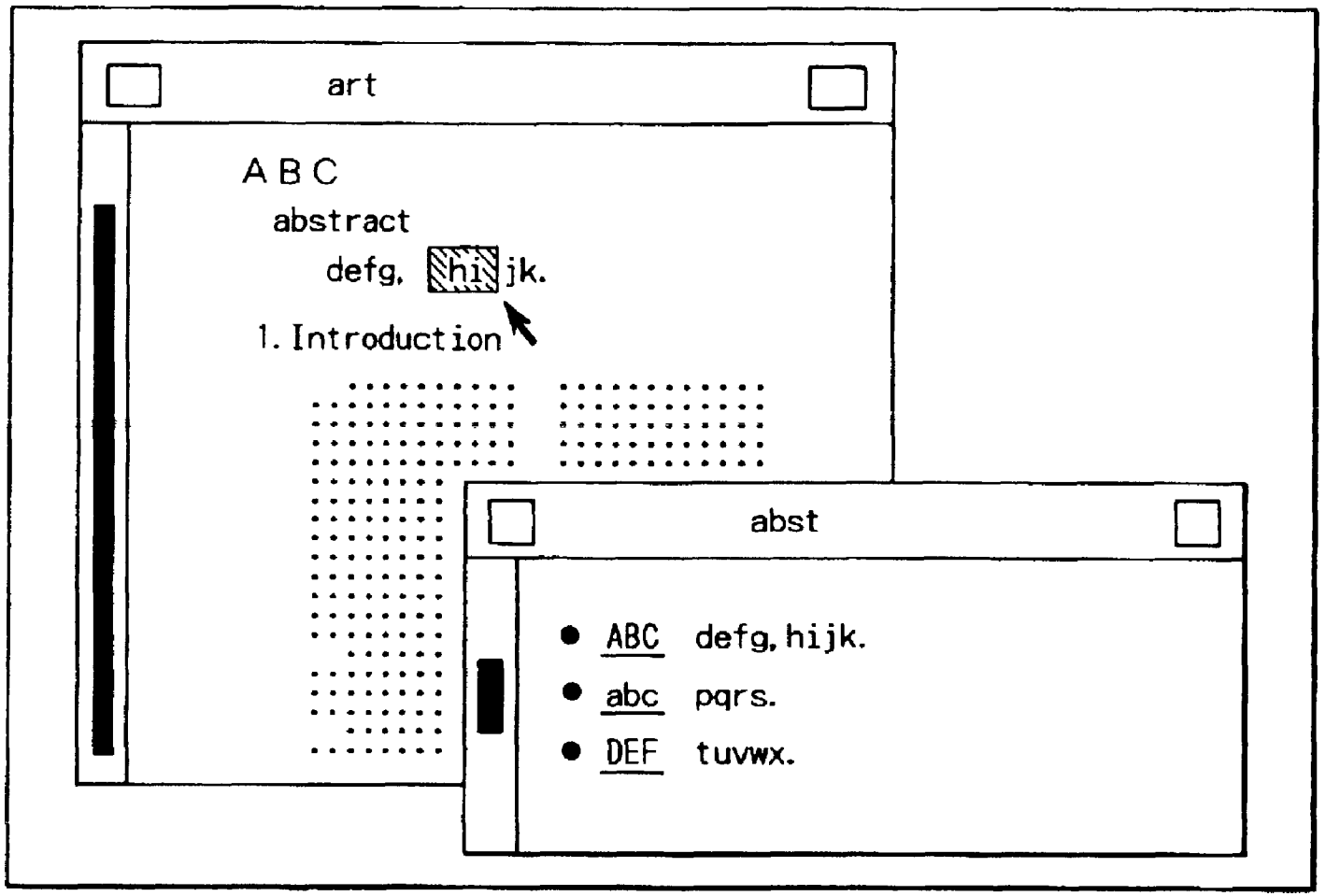
FIG. 47 shows an example of display when a shared portion is selected.

FIG. 46 shows a system configuration of the present embodiment. The hardware configuration is identical to that of the Embodiment 1 except that the storage 10 has a sharing determination program 13, a content updating display program 17 and a sharing notification program 18.

A process of the present embodiment for selecting the update portion of the document content and substitute it by a new character sequence is explained. The selection of document which includes the portion of the document to be updated and the direction to substitute by the character sequence may be implemented by the prior art method. The substitution process for the direction may be implemented in the same manner as that described in the above embodiment.

It is assumed that in the data structure shown in FIG. 38, the substitution of the character sequence is commanded. The control is shifted to the content update program 17. Referring to a flow chart of FIG. 49, the content update process is explained.

In a step S4901, the selected portion is checked to detect which partial sequence of the content of the document element object it belongs to. This may be implemented by the prior art structure or document handling technique.

Then, in a step 54902, whether the detected document element content is shared with other document element content or not by using the sharing determination program 13. For example, the sharing determination program 13 determines the sharing when the reference count of the document element content object which is pointed by the document element object is two or larger, and determines as non-sharing if the count is smaller than two.

Then, if the sharing is determined in the step S4902, the process proceeds to a step S4904, and if the non-sharing is determined, the process proceeds to a step S4905.

Figure 50:
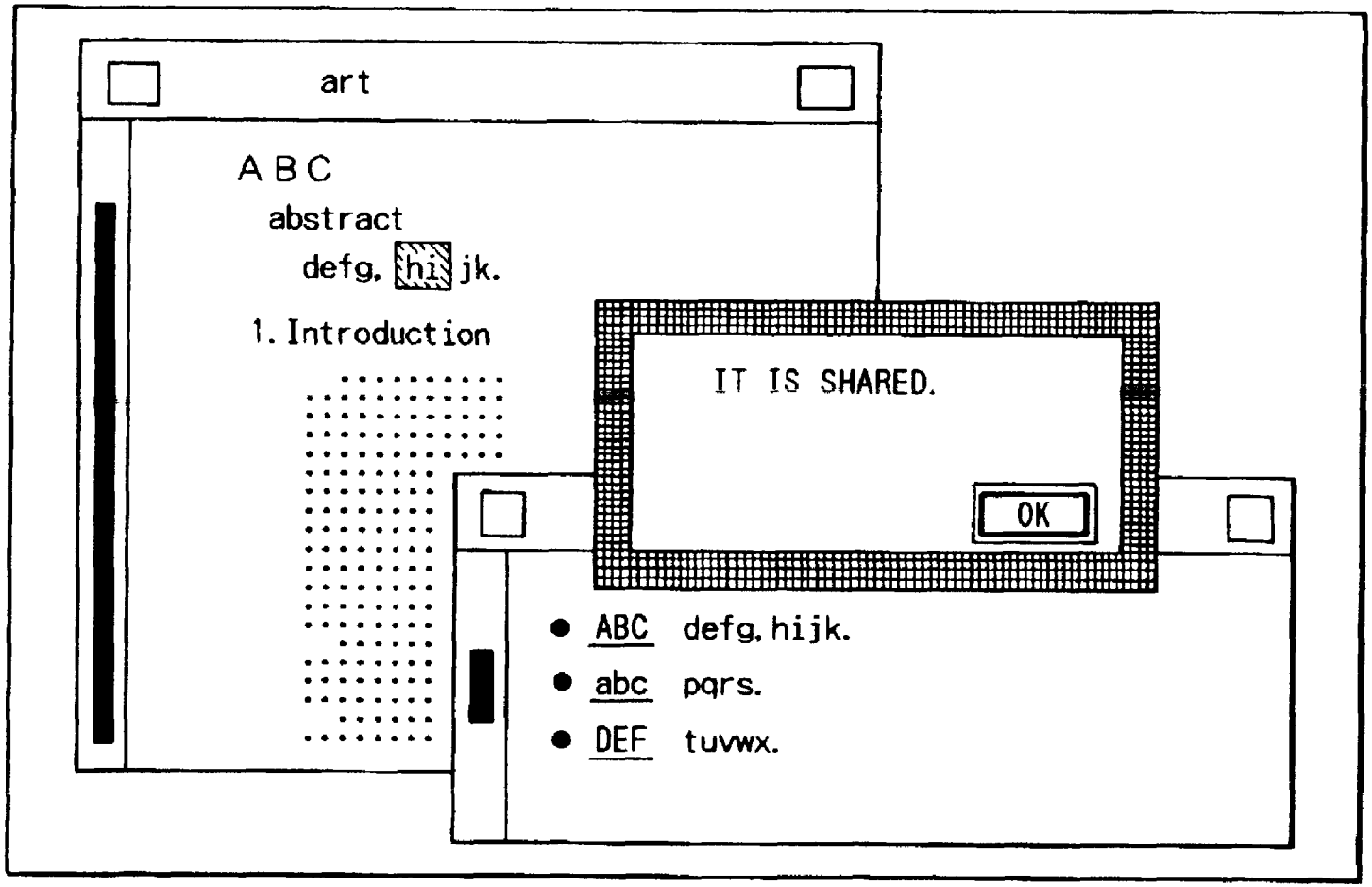
FIG. 50 shows an example of display when the updating of a shared portion is directed.

In the step S4904, the sharing of the object to be updated is informed by using the sharing notification program 18. For example, the sharing notification program 18 displays an interactive window as shown in FIG. 50 to inquire to the operator whether the updating of the document is to be continued or not. It waits until an "OK" button 48 is depressed, and when it is depressed, it returns to a call process. In a step S4905, the conventional content substitution process is carried out and the process is terminated and return to the call process.

In this manner, when the operator attempts to change the shared portion, the interactive window is outputted and the sharing is notified.

[Embodiment 13]

In the above embodiment, when the updating of the shared portion is requested, the interactive window is displayed to notify that it is the shared portion. Alternatively, the content updating program which notifies by ringing a buzzer may be used. Where an audio output is available, announcement of "It is shared" may be used. Further alternatively, the display may be temporarily switched such as reversal.

[Embodiment 14]

The present embodiment differs in that it uses a content update program 171 (not shown) instead of the content update program 17, and uses a sharing notification program 181 (not shown) instead of the sharing notification program 18. The process of the present embodiment up to the command to the substitution of the character sequence and the shift of the control to the content updating program 171 is identical to that of the Embodiment 12.

Figure 49:
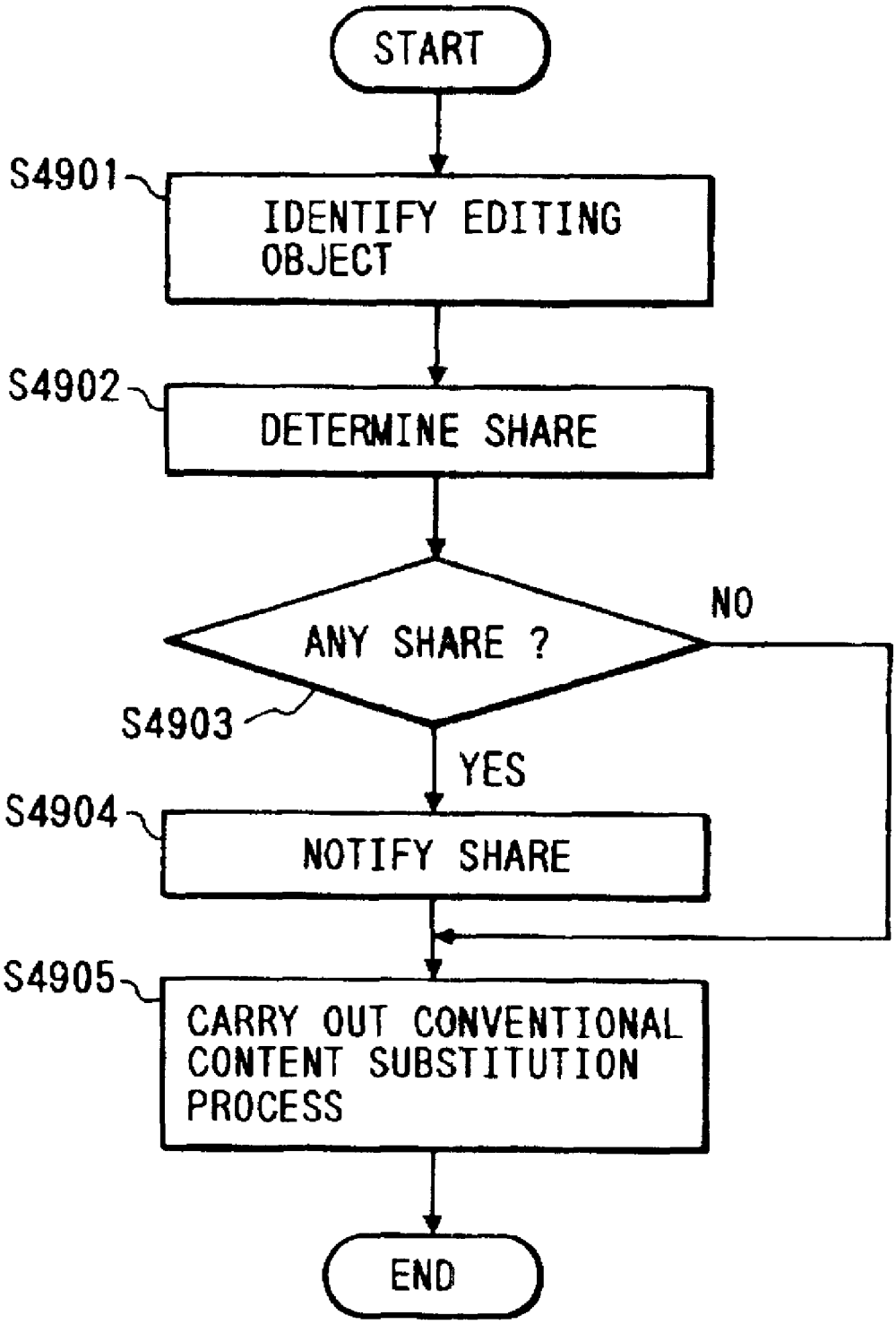
FIG. 49 shows a flow chart of a content update process.
Figure 51:
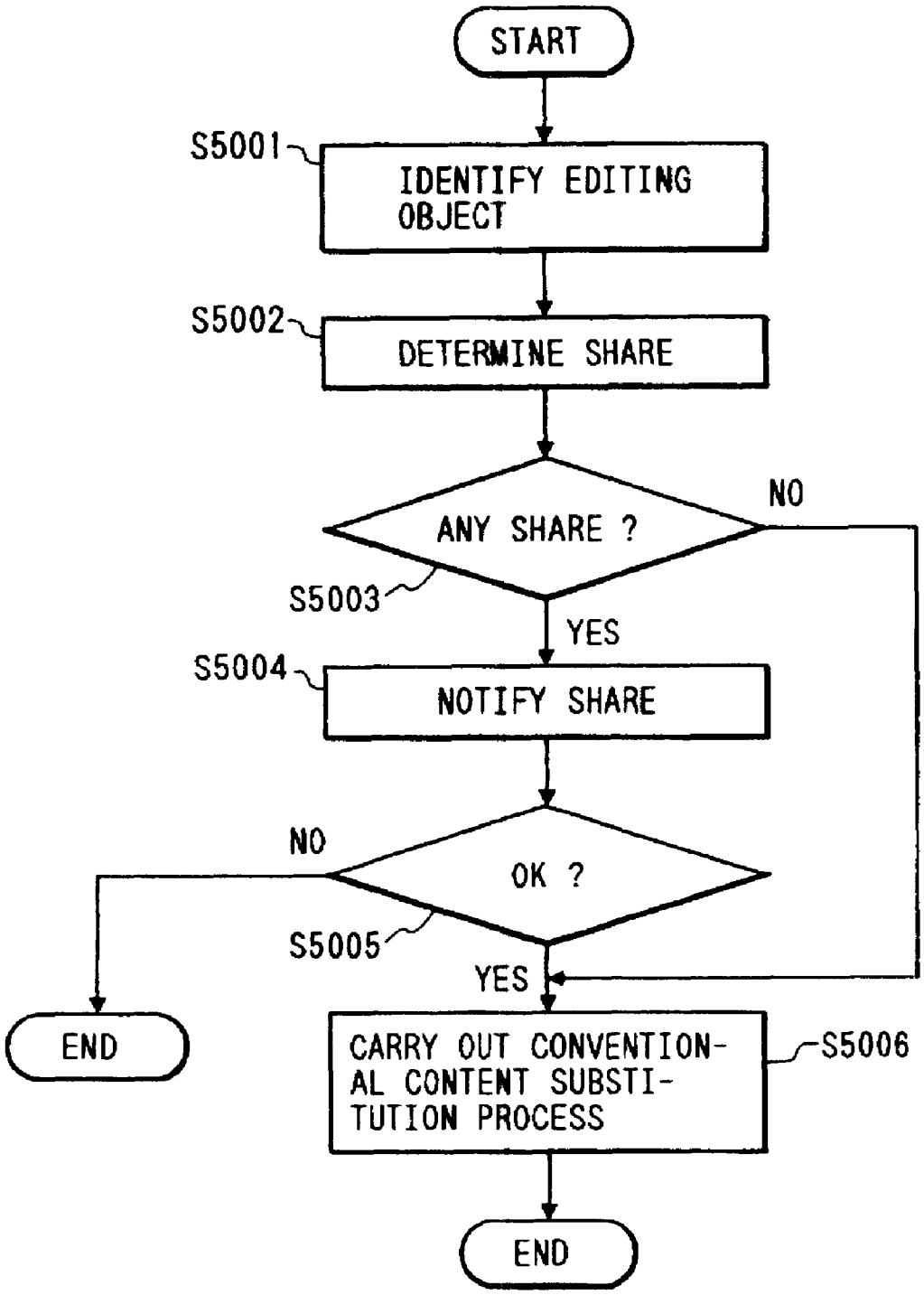
FIG. 51 shows a flow chart of a content update process.

A process flow chart of the content updating program 171 of the present embodiment differs only in part from the process flow chart of the content updating program 17 shown in FIG. 49. This is explained with reference to a flow chart of FIG. 51.

Steps S5001 to S5003 are identical to the steps S4902 to S4903.

Figure 52:
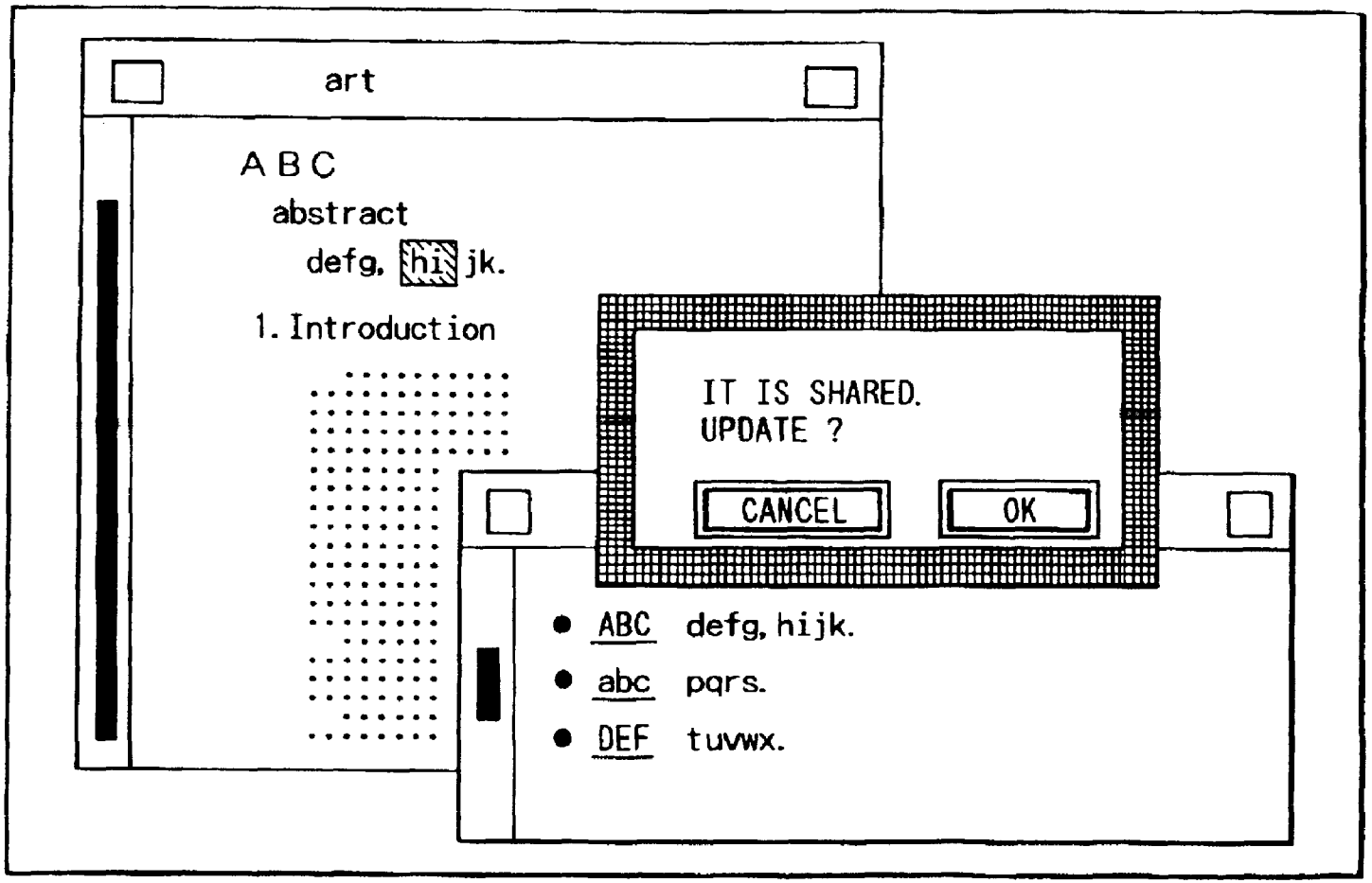
FIG. 52 shows an example of display when the updating of a shared portion is directed.

In a step S5004, the sharing of the object to be updated is notified by using the sharing notification program 181. The sharing notification program 181 returns an operator indication as a return value. For example, the sharing notification program 181 display the interactive window as shown in FIG. 52 to inquire to the operator whether the updating of the document is to be continued or not. It waits until the "OK" button 48 or a "cancel" button 49 is depressed, when it returns the result. The display and the button entry may be implemented by the prior art technology. Next to the step S5004, the process proceeds to a step S5006. The process is switched in accordance with the return value at the step S5004. Namely, if the return value is "OK", the process proceeds to a step S5005, and if it is "cancel", the process is terminated and returns to the call process. In the step S5005, the content substitution process is executed as it is in the step S4905 of the Embodiment 12 and the process is terminated and returns to the call process.

In accordance with the present embodiment, when the operator attempts to update the shared portion, the interactive window is outputted and the sharing is notified and the inquiry is immediately made as to continue the updating. Thus, the operator may suspend the sharing at this moment if he/she has not noticed the sharing before so that inadvertent updating is prevented.

In accordance with the present embodiment, when the portion which is shared with other document element is to be updated, the sharing is notified so that the undesired updating which may affect to other document element can be avoided, and the updating may be executed after the confirmation of the sharing.

Although the present invention has been described in its preferred form with a certain degree of particularity, many apparently widely different embodiments of the invention can be made without departing from the spirit and scope thereof. It is to be understood that the invention is not limited to the specific embodiments thereof except as defined in the appended claims.

What is claimed is:

1. A document processing apparatus for managing a plurality of documents each containing a plurality of document elements, comprising;

*a storage constructed to store a plurality of documents;*

*a* first designation [means for designating] *unit constructed to designate*, from a plurality of document elements of a source document, a first document element having a first pointer to a first content to be shared with a destination document;

*a* second designation [means for designating] *unit constructed to designate* from a plurality of document elements of a destination document, a second document element having a second pointer to a second content; and

*a* replacing [means for replacing] *unit constructed to designate* the second pointer with the first pointer so that the second document element designated by said second designation [means] *unit* should share the first content with the first document element designated by said first designation [means] *unit*.

2. A document processing apparatus according to claim 1, further comprising:

*a* display control [means for displaying] *unit constructed to display* the first and second documents on a display;

said first designation [means] *unit* designating on the display the first document element having the content to be shared with the second document, from the displayed source document; and said second designation [means] *unit* designating on the display the second document element from the displayed destination document.

3. A document processing apparatus according to claim 1, wherein said first designation [means] *unit* designates the first document element by an order thereof in the first document and said first designation [means] *unit* designates the second document by an order thereof in the second document.

4. A document processing apparatus according to claim 1, further comprising:

*a* storage [means for storing] *constructed to store* the first pointer of the first document element designated by said first designation [means] *unit*; and said replacing [means] *unit* replacing the second pointer with the first pointer stored in said storage [means] each time the second document element is designated by said second designation [means] *unit*.

5. A document processing apparatus according to claim 4, wherein said first designation [means] *unit* designates a plurality of first pointers and said storage [means] stores the first pointers with names thereof, and said apparatus further comprising *a* selecting [means for selecting] *unit constructed to select* one of the first pointers by specifying the name and said replacing [means] *unit* replaces the second pointer with the one of the first pointers selected by said selecting [means] *unit*.

6. A document processing apparatus for managing a plurality of documents each containing a plurality of document elements, comprising:

*a* storage [means for storing] *constructed to store* document data with file names to be read out by a read command with a file name as a content of a document element;

*a* first designation [means for designating] *unit constructed to designate*, from a plurality of document elements of a source document, a first document element having the read command with a file name of a first content to be shared with a destination document;

*a* second designation [means for designating] *unit constructed to designate*, from a plurality of document elements of a destination document, a second document element having a second content;

*a* replacing [means for replacing] *unit constructed to replace* the second content with the read command by using the file name of the first content as an argument of the command; and

*a* control [means for outputting] *unit constructed to output* the file content of the file name as the content of the document element when the document containing the document element having the read command with the file name is outputted.

7. A document processing apparatus for managing a plurality of documents each containing a plurality of document elements, comprising:

*a storage constructed to store a plurality of documents;*

*a* first designation [means for designating] *unit constructed to designate*, from a plurality of document elements of a source document, a first document element having a first content to be shared with a destination document;

*a* separation [means for separating] *unit constructed to separate* the first content of the first document element designated by said first designation [means] *unit* from the source document;

*a* first definition [means for defining] *unit constructed to define* such that the first content of the first document element separated by said separation means is referred to by the source document as the content of the first document element;

*a* second designation [means for designating] *unit constructed to designate*, from a plurality of document elements of a destination document, a second document element having a second content; and

*a* second definition [means for defining] *unit constructed to define* such that the content of the first document element separated by said separation [means] *unit* is referred to by the destination document as the content of the second document element in place of the second content.

8. A document processing apparatus according to claim 7, further comprising:

*a* display control [means for displaying] *unit constructed to display* the first and second documents on a display;

said first designation [means] *unit* designating the document element from the source document displayed by said display control [means] *unit*; and said second designation [means] *unit* designating the document element from the destination document displayed by said display control [means] *unit*.

9. A document processing apparatus according to claim 7, wherein the first document element has a first pointer to the first content and the second document element has a second pointer to the second content, [said pointer] *a* storage [means] storing a pointer to the document element to be shared and said [separate means] *separation unit* transporting the first content to a new segment; and said first and second definition [means] *unit* defining the contents of the first and second document elements by replacing the first and second pointers with a pointer to the segment, respectively.

10. A document processing apparatus for managing a plurality of documents each containing a plurality of document elements by setting management information in each document, comprising:

*a storage constructed to store a plurality of documents;*

*a* first designation [means for designating] *unit constructed to designate*, from a plurality of document elements of a source document, a first document element having a content to be shared with a destination document;

*a* setting [means for setting] *unit constructed to set* new management information to the first document element designated by said first designation [means] *unit*;

*a* control [means for controlling] *unit constructed to control* the first document element designated by said first designation [means] *unit* to manage by the management information set by said setting [means] *unit* in place of the management information to the source document;

*a* first definition [means for defining] *unit constructed to define* to refer the management content of the management information set by said setting [means] *unit* as the content of the first document element in the source document;

*a* second designation [means for designating] *unit constructed to designate*, from a plurality of document elements of a destination document, a second document element having a second content; and

*a* second definition [means for defining] *unit constructed to define* to refer the management content of the management information set by said setting [means] *unit* as the content of the second document element in the destination document so that the second document element designated by said second designation [means] *unit* should share the content with the first document element designated by said first designation [means] *unit*.

11. A document processing apparatus for managing a plurality of documents each containing a plurality of document elements, comprising:

*a storage constructed to store a plurality of documents;*

*a* first designation [means for designating] *unit constructed to designate*, from a plurality of document elements of a source document, a first document element having a first content to be shared with a destination document;

*a* second designation [means for designating] *unit constructed to designate*, from a plurality of document elements of a destination document, a second document element having a second content;

*a* definition [means for defining] *unit constructed to define* the first content of the first document element as a sharing content to be shared by the first and second document elements;

*an* instruction [means for instructing] *unit constructed to instruct* the display of the source document or the destination document;

*a* detection [means for detecting] *unit constructed to detect* the document element containing the sharing content defined by said definition [means] *unit*, from the document instructed to be displayed by said instruction [means] *unit*; and

*a* display control [means for displaying] *unit constructed to display* the document instructed to be displayed by said instruction [means] *unit* in a manner distinguishable the document element detected by said detection [means] *unit* from other elements of the document.

12. A document processing apparatus according to claim 11, wherein said display control [means] *unit* displays the detected document element with specified characters or character sequences added before and after the document element.

13. A document processing apparatus according to claim 11, wherein said display control [means] *unit* displays the detected document element in a different form than that for other portions.

14. A document processing apparatus according to claim 11, wherein the documents are nested with respect to the sharing of the document element content, said detection [means] *unit* determined the depth of the nesting, and said display control [means] *unit* distinguishably displays the depth of the nesting.

15. A document processing apparatus for managing a plurality of documents each containing a plurality of document elements comprising:

*a storage constructed to store a plurality of documents;*

*a* first designation [means for designating] *unit constructed to designate*, from a plurality of document elements of a source document, a first document element having a first content to be shared with a destination document;

*a* second designation [means for designating] *unit constructed to designate*, from a plurality of document elements of a destination document, a second document element having a second content;

*a* definition [means for defining] *unit constructed to define* the first content of the first document element as a sharing content to be shared by the first and second document elements;

*an* instruction [means for specifying] *unit constructed to specify* a document element and instructing the editing of the document element;

*a* determination [means for determining] *unit constructed to determine* whether the document element specified by said instruction [means] *unit* contains the sharing content defined by said definition [means] *unit*; and

*a* notification [means for notifying] *unit constructed to notify* to a user of the determination result if the document element is determined to contain the sharing content by said determination [means] *unit*.

16. A document processing method in a document processing apparatus for managing a plurality of document each containing a plurality of document elements, comprising the steps of:

designating, from a plurality of document elements of a source document, a first document element having a first pointer to a first content to be shared with a destination document;

designating, from a plurality of document elements of a destination document, a second document element having a second pointer to a second content; and replacing the second pointer with the first pointer so that the first document element should share the first content with the second document element of the [second] *destination* document.

17. A document processing method in a document processing apparatus for managing a plurality of document each containing a plurality of document elements, comprising the steps of:

storing document data with file names to be read out by a read command with a file name as a content of a document element, in a memory;

designating, from a plurality of document elements of a source document, a first document element having the read command with a file name of a first content to be shared with a destination document;

designating, from a plurality of document elements of a destination document, a second document element having a second content;

replacing the second content with the read command by using the file name as an argument of the command; and outputting the file content of the file name as the content of the document element when the document containing the document element having the read command with the file name is outputted.

18. A document processing method in a document processing apparatus for managing a plurality of documents each containing a plurality of document elements, comprising:

designating, from a plurality of document elements of a source document, a first document element having a first content to be shared with a destination document;

separating the first content of the first document element designated in said designating step from the source document;

defining such that the first content of the first document element separated in said separating step is referred to by the source document as the content of the first document element;

designating, from a plurality of document elements of a destination document, a second document element having a second content; and defining such that the content of the first document element separated in said separating step is referred to by the destination document as the content of the second document element in place of the second content.

19. A document processing method in a document processing apparatus for managing a plurality of documents each containing a plurality of document elements by setting management information in each document, comprising the steps of:

designating, from a plurality of document elements of a source document, a first document element having a content to be shared with a destination document;

setting new management information to the first document element;

controlling the first designated document element to manage by the set management information in place of the management information to the source document;

defining to refer the management content of the set management information as to the content of the first document element in the source document;

*designating, from a plurality of document elements of a destination document, a second document element having a second content;* and defining to refer the management content of the set management information as the content of the second document element in the destination document so that the second document element [designated by said second designation means] should share the content with the first document element [designated by said first designation means].

20. A document processing method in a document processing apparatus for managing a plurality of documents each containing a plurality of document elements comprising the steps of:

designating, from a plurality of document elements of a source document, a first document element having a first content to be shared with a designation document;

designating, from a plurality of document elements of a destination document, a second document element having a second content;

defining the first content of the first document element as a sharing content to be shared by the first and second document elements;

instructing the display of the source document or the destination document;

detecting the document element containing the defined sharing content from the document instructed to be displayed; and displaying the document instructed to be displayed in a manner distinguishable the detected document element from other elements of the document.

21. A document processing [apparatus] *method* for managing a plurality of documents each containing a plurality of document elements, comprising the steps of:

designating, from a plurality of document elements of a source document, a first document element having a first content to be shared with a destination document;

designating, from a plurality of document elements of a destination document, a second document element having a second content;

defining the first content of the first document element as a sharing content to be shared by the first and second document elements;

specifying a document element and instructing the edition of the document element;

determining whether the specified document element contains the sharing content defined in said definition step; and notifying to a user of the determination result if the document element is determined to contain the sharing content.

*22. A document processing apparatus for managing a plurality of documents each containing a plurality of document elements, comprising:*

*a storage constructed to store a plurality of documents;*

*a first designation unit constructed to designate, from a plurality of document elements of a first document, a first document element containing a first content to be shared with a second document;*

*a second designation unit constructed to designate, from a plurality of document elements of a second document, a second document element containing a second content;*

*a revising unit constructed to revise a content in a document element of one of the plurality of documents; and*

*a sharing unit constructed to share the first content between the first document element and the second document element by replacing the second content in the second document element with the first content, and for updating, in response to a revision of the first content in one of the first and second document elements by said revising unit, the first content in the other of the first and second document elements to be consistent with the revised first content.*

*23. The apparatus according to claim 22, further comprising a display control unit for displaying the first and second documents on a display.*

*24. The apparatus according to claim 23, wherein said first and second designation unit designate the first document element of the first document and the second document element of the second document on the display, respectively.*

*25. The apparatus according to claim 24, further comprising an area specifying unit constructed to specify area in the document on the display; and wherein*

*said first designation unit designates a minimum document element including a first area in the first document specified by said area specifying unit as the first document element, and*

*said second designation unit designates a minimum document element including a second area in the second document specified by said area specifying unit as the second document element.*

*26. The apparatus according to claim 23, wherein said display control unit displays the first content in the first and second document elements in respective layouts corresponding to the types of the first and second documents.*

*27. The apparatus according to claim 23, further comprising detection unit for detecting the document element containing a content shared by said sharing unit, from the document to be displayed by said display control unit, and*

*said display control unit displays the document in a manner that the document element detected by said detection unit is distinguishable from other elements of the document.*

*28. The apparatus according to claim 23, further comprising:*

*a specifying unit constructed to specify a document element to be revised by said revising unit;*

*a determination unit constructed to determine whether the document element specified by said specifying unit contains a sharing content shared by said sharing unit; and*

*a notification unit constructed to notify a user of a determination result if it is determined by said determination unit that the document element contains the sharing content.*

*29. A document processing method for managing a plurality of documents each containing a plurality of document elements, comprising the steps of:*

*designating, from a plurality of document elements of a first document, a first document element containing a first content to be shared with a second document;*

*designating, from a plurality of document elements of a second document, a second document element containing a second content;*

*revising a content in a document element of one of the plurality of documents; and*

*sharing the first content between the first document element and the second document element by replacing the second content in the second document element with the first content, and updating, in response to a revision of the first content in one of the first and second document elements, the first content in the other of the first and second document elements to be consistent with the revised first content.*

*30. The method according to claim 29, further comprising the step of displaying the first and second documents on a display.*

*31. The method according to claim 30, wherein, in said designating step, the first document element of the first document and the second document element of the second document are designated on the display, respectively.*

*32. The method according to claim 30, wherein,*

*in said step of designating the first document element, a first area is specified in the first document and a minimum document element including the first area is designated as the first document element, and*

*in said step of designating the second document element, a second area is specified in the second document and a minimum document element including the second area is designated as the second document element.*

*33. The method according to claim 30, wherein, in said step of displaying the first and second documents on the display, the first content in the first and second document elements are displayed in respective layouts corresponding to the types of the first and second documents.*

*34. The method according to claim 30, further comprising the steps of:*

*instructing to display the first document or the second document;*

*detecting the document element containing a sharing content shared with another document element from the document instructed to be displayed, and*

*displaying the document instructed to be displayed in a manner that the document element detected in said detecting step is distinguishable from other elements of the document.*

*35. The method according to claim 30, further comprising the steps of:*

*specifying a document element to be revised;*

*determining whether the specified document element contains a sharing content shared with another document element; and*

*notifying a user of a determination result if it is determined in said determination step that the document element contains the sharing content.*

*36. A computer-readable storage medium storing a document processing program for controlling a computer to manage a plurality of documents each containing a plurality of document elements, said program comprising codes for causing the computer to perform the steps of:*

*designating, from a plurality of document elements of a source document, a first document element having a first pointer to a first content to be shared with a destination document;*

*designating, from a plurality of document elements of a destination document, a second document element having a second pointer to a second content; and*

*replacing the second pointer with the first pointer so that the first document element should share the first content with the second document element of the designation document.*

*37. A computer-readable storage medium storing a document processing program for controlling a computer to manage a plurality of documents each containing a plurality of document elements, said program comprising codes for causing the computer to perform the steps of:*

*storing, in a memory, document data with file names to be read out by a read command with a file name as a content of a document element;*

*designating, from a plurality of document elements of a source document, a first document element having the read command with a file name of a first content to be shared with a destination document;*

*designating, from a plurality of document elements of a destination document, a second document element having a second content;*

*replacing the second content with the read command by using the file name as an argument of the command; and*

*outputting the file content of the file name as the content of the document element when the document containing the document element having the read command with the file name is outputted.*

*38. A computer-readable storage medium storing a document processing program for controlling a computer to manage a plurality of documents each containing a plurality of document elements, said program comprising codes for causing the computer to perform the steps of:*

*designating, from a plurality of document elements of a source document, a first document element having a first content to be shared with a destination document;*

*separating the first content of the first document element designated in said designating step from the source document;*

*defining such that the first content of the first document element separated in said separating step is referred to by the source document as the content of the first document element;*

*designating, from a plurality of document elements of a destination document, a second document element having a second content; and*

*defining such that the first content of the first document element separated in said separating step is referred to by the destination document as the content of the second document element in place of the second content.*

*39. A computer-readable storage medium storing a document processing program for controlling a computer to manage a plurality of documents each containing a plurality of document elements, said program comprising codes for causing the computer to perform the steps of:*

*designating, from a plurality of document elements of a source document, a first document element having a content to be shared with a destination document;*

*setting new management information to the first document element;*

*controlling the first designated document element to manage by the set management information in place of the management information to the source document;*

*defining to refer the management content of the set management information as to the content of the first document element in the source document;*

*designating, from a plurality of document elements of a destination document, a second document element having a second content; and*

*defining to refer the management content of the set management information as the content of the second document element in the destination document so that the second document element should share the content with the first document element.*

*40. A computer-readable storage medium storing a document processing program for controlling a computer to manage a plurality of documents each containing a plurality of document elements, said program comprising codes for causing the computer to perform the steps of:*

*designating, from a plurality of document elements of a source document, a first document element having a first content to be shared with a designation document;*

*designating, from a plurality of document elements of a destination document, a second document element having a second content;*

*defining the first content of the first document element as a sharing content to be shared by the first and second document elements;*

*instructing to display the source document or the destination document;*

*detecting the document element containing the defined sharing content from the document instructed to be displayed; and*

*displaying the document instructed to be displayed in a manner that the detected document element is distinguishable from other elements of the document.*

*41. A computer-readable storage medium storing a document processing program for controlling a computer to manage a plurality of documents each containing a plurality of document elements, said program comprising codes for causing the computer to perform the steps of:*

*designating, from a plurality of document elements of a source document, a first document element having a first content to be shared with a destination document;*

*designating, from a plurality of document elements of a destination document, a second document element having a second content;*

*defining the first content of the first document element as a sharing content to be shared by the first and second document elements;*

*specifying a document element and instructing the editing of the document element;*

*determining whether the specified document element contains the sharing content defined in said defining step; and*

*notifying a user of a determination result if it is determined that the document element contains the sharing content.*

*42. A computer-readable storage medium storing a document processing program for controlling a computer to manage a plurality of documents each containing a plurality of document elements, said program comprising codes for causing the computer to perform the steps of:*

*designating, from a plurality of document elements of a first document, a first document element containing a first content to be shared with a second document;*

*designating, from a plurality of document elements of a second document, a second document element containing a second content;*

*revising a content in a document element of one of the plurality of documents; and*

*sharing the first content between the first document element and the second document element by replacing the second content in the second document element with the first content, and updating, in response to a revision of the first content in one of the first and second document elements, the first content in the other of the first and second document elements to be consistent with the revised first content.*

* * * * *